(12) United States Patent
Li et al.

(10) Patent No.: US 12,626,958 B2
(45) Date of Patent: May 12, 2026

---

(54) ZINC-IODINE BATTERY

(71) Applicant: The Regents of the University of California, Oakland, CA (US)

(72) Inventors: Yat Li, Santa Cruz, CA (US); Dun Lin, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 1142 days.

(21) Appl. No.: 17/720,617

(22) Filed: Apr. 14, 2022

(65) Prior Publication Data

US 2022/0336866 A1 Oct. 20, 2022

Related U.S. Application Data

(60) Provisional application No. 63/174,638, filed on Apr. 14, 2021.

(51) Int. Cl.
| | |
|---|---|
| *H01M 10/36* | (2010.01) |
| *H01M 4/02* | (2006.01) |
| *H01M 4/36* | (2006.01) |
| *H01M 4/38* | (2006.01) |
| *H01M 4/583* | (2010.01) |
| *H01M 4/60* | (2006.01) |

(52) U.S. Cl.
CPC ......... *H01M 10/365* (2013.01); *H01M 4/366* (2013.01); *H01M 4/38* (2013.01); *H01M 4/583* (2013.01); *H01M 4/608* (2013.01); *H01M 2004/027* (2013.01); *H01M 2004/028* (2013.01); *H01M 2300/0011* (2013.01)

(58) Field of Classification Search
CPC ...... H01M 10/365; H01M 4/366; H01M 4/38; H01M 4/583; H01M 4/608; H01M 2004/027; H01M 2004/028; H01M 2300/0011; H01M 4/88; H01M 4/90; H01M 8/023; H01M 8/188
See application file for complete search history.

(56) References Cited

FOREIGN PATENT DOCUMENTS

| | | | | |
|---|---|---|---|---|
| WO | WO2011/097286 | * | 11/2011 | ............ H01M 12/06 |
| WO | WO2017/139939 | * | 8/2017 | ............. H01M 4/38 |

OTHER PUBLICATIONS

Sonigara et. al., "Self-Assembled Solid-State Gel Catholyte Combating Iodide Diffusion and Self-Discharge for Stable Flexible Aqueous Zn—I2 Battery" 2020, Wiley-VCH GmbH, Advanced Energy Materials, DOI: 10.1002/aenm.202001997 (Year: 2020).*
Liang et al., "Preparation and characterization of sulfur-polypyrrole composites with controlled morphology as high capacity cathode for lithium batteries," Solid State Ionics 192 (2011) 347-350 (Year: 2011).*
Mengoli et al., On the use of pyrrole black in zinc-halogen batteries, 1985, Journal of Applied Electrochemistry 15(1985)697-704 (Year: 1985).*

(Continued)

*Primary Examiner* — Helen Oi K Conley
(74) *Attorney, Agent, or Firm* — Carter, DeLuca & Farrell LLP; Vadim Vapnyar

(57) ABSTRACT

An aqueous rechargeable zinc-iodine battery includes an aqueous electrolyte solution including zinc-iodine; a zinc anode; and a double-layered cathode having: a conductive substrate, and an adsorptive layer disposed over the conductive substrate.

9 Claims, 24 Drawing Sheets

(56) References Cited

OTHER PUBLICATIONS

Y. Li, et al., "Recent advances in zinc-air batteries", Chem. Soc. Rev. 2014, 43, 5257-5275.

C. J. Xu, et al., "Energetic Zinc Ion Chemistry: The Rechargeable Zinc Ion Battery", Angew. Chem. Int. Ed. 2012, 51, 933-935.

G. Z. Fang, et al., "Recent Advances in Aqueous Zinc-Ion Batteries", ACS Energy Lett. 2018, 3, 2480-2501.

F. X. Wang, et al., "A Stimulus-Responsive Zinc-Iodine Battery with Smart Overcharge Self-Protection Function", Adv. Mater. 2020, 32, 2000287.

J. J. Hong, et al., "A Dual Plating Battery with the Iodine/[ZnIx(OH2)4-x]2-x" Angew. Chem. Int. Ed. 2019, 58, 15910-15915.

C. Xie, et al., "A Long Cycle Life, Self-Healing Zinc-Iodine Flow Battery with High Power Density", Angew. Chem. Int. Ed. 2018, 57, 11171-11176.

H. Pan, et al., "Controlling Solid?Liquid Conversion Reactions for a Highly Reversible Aqueous Zinc Iodine Battery", ACS Energy Lett. 2017, 2, 2674-2680.

B. Li, et al., "Metal-Organic Frameworks as Highly Active Electrocatalysts for High-Energy Density, Aqueous Zinc-Polyiodide Redox Flow Batteries", Nano Lett. 2016, 16, 4335-4340.

B. Li, et al., "Ambipolar zinc-polyiodide electrolyte for a high-energy density aqueous redox flow battery", Nat. Commun. 2015, 6, 6303.

Z. Wang, et al., "A Metal-Organic Framework Host for Highly Reversible Dendrite-free Zinc Metal Anodes", Joule 2019, 3, 1289-1300.

G.-M. Weng, et al., "Unlocking the capacity of iodide for high-energydensity zinc/polyiodide and lithium/polyiodide redox flow batteries", Energy Environ. Sci. 2017, 10, 735-741.

Y. Li, et al., "Rechargeable aqueous zinc-iodine batteries: pore confining mechanism and flexible device application", Chem. Commun. 2018, 54, 6792-6795.

H. Yang, et al., "A Metal-Organic Framework as a Multifunctional Ionic Sieve Membrane for Long-Life Aqueous Zinc-Iodide Batteries", Adv. Mater. 2020, 32, 2004240.

A. Manthiram, et al., "Challenges and Prospects of Lithium-Sulfur Batteries", Acc. Chem. Res. 2013, 46, 1125-1134.

A. Manthiram, et al., "Rechargeable Lithium-Sulfur Batteries", Chem. Rev. 2014, 114, 11751-11787.

A. Manthiram, et al., "Lithium-Sulfur Batteries: Progress and Prospects", Adv. Mater. 2015, 27, 1980-2006.

M. J. Goodwin, et al., "Halogen and Hydrogen Bonding in Povidone-Iodine and Related Co-Phases", Cryst. Growth Des. 2017, 17, 5552-5558.

H.-U. Schenck, et al., "Structure of Polyvinylpyrrolidone-Iodine (Povidone-Iodine)", J. Pharm. Sci. 1979, 68, 1505-1509.

S. Moulay, "Molecular iodine/polymer complexes", J. Polym. Eng. 2013, 33, 389-443.

F.-S. Cai, et al., "Iodine/b-cyclodextrin composite cathode for rechargeable lithiumiodine batteries", J. Mater. Chem. A 2018, 29, 11540-11545.

H. Ge, et al., "Ion exchange properties of polypyrrole", React. Polym. 1992, 18, 133-140.

W. Li, et al., "A high energy efficiency and long life aqueous Zn—I2 battery", J. Mater. Chem. A 2020, 8, 3785-3794.

J. Zhang, et al., "An all-aqueous redox flow battery with unprecedented energy density", Energy Environ. Sci. 2018, 11, 2010-2015.

C. Xie, "Highly stable zinc-iodine single flow batteries with super high energy density for stationary energy storage", Energy Environ. Sci. 2019, 12, 1834-1839.

K. Lu, et al., "Sulfur and nitrogen enriched graphene foam scaffolds for aqueous rechargeable zinc-iodine battery", Electrochim. Acta 2019, 296, 755-761.

J. Lee, et al., "Nanoconfinement of redox reactions enables rapid zinc iodide energy storage with high efficiency", J. Mater. Chem. A 2017, 5, 12520-12527.

Kresse, G., et al., "Efficient iterative schemes for ab initio total-energy calculations using a plane-wave basis set", Phys. Rev. B 1996, 54 (16), 11169-11186.

Blöchl, P. E., "Projector augmented-wave method", Phys. Rev. B 1994, 50 (24), 17953-17979.

Kresse, G., et al., "From ultrasoft pseudopotentials to the projector augmented-wave method", Phys. Rev. B 1999, 59 (3), 1758-1775.

Grimme, S., et al., "A consistent and accurate ab initio parametrization of density functional dispersion correction (DFT-D) for the 94 elements H—Pu.", J. Chem. Phys. 2010, 132 (15), 154104.

* cited by examiner

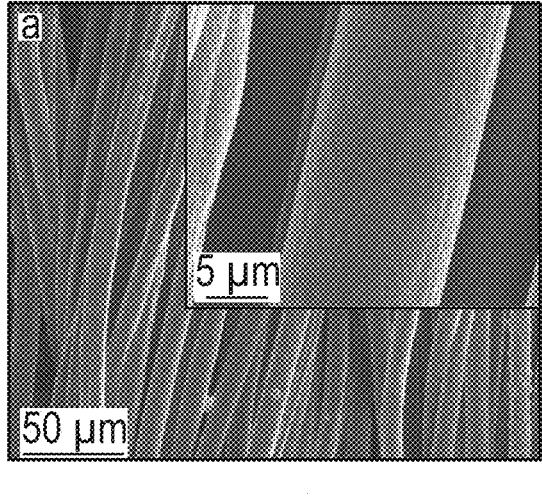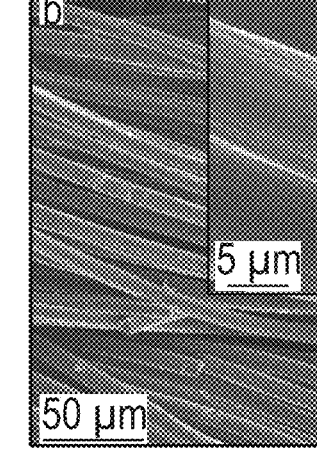
FIG. 2A
FIG. 2B
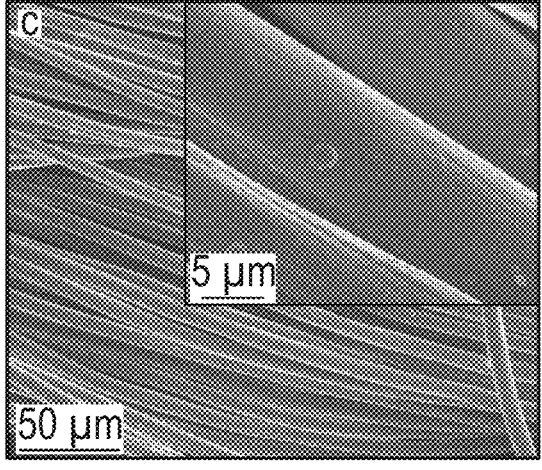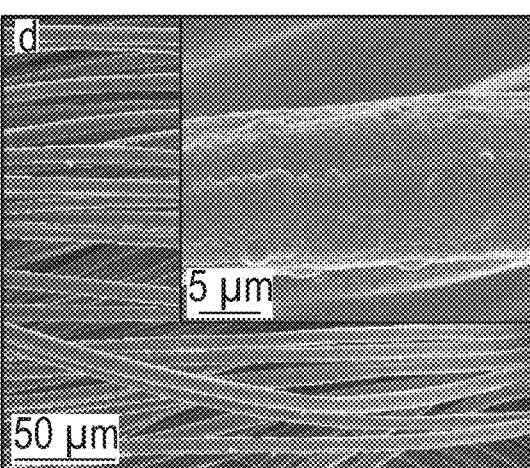
FIG. 2C
FIG. 2D

FIG. 14

ZINC-IODINE BATTERY

CROSS-REFERENCE TO RELATED APPLICATION

The present application claims the benefit of and priority to U.S. Provisional Application No. 63/174,638, filed on Apr. 14, 2021. The entire disclosure of the foregoing application is incorporated by reference herein.

GOVERNMENT LICENSE RIGHTS

This invention was made with Government support under Grant No. NNX15AQ01, awarded by Merced Nanomaterials Center for Energy and Sensing (MACES), a NASA funded MIRO center. The Government has certain rights in the invention.

BACKGROUND

Aqueous rechargeable zinc-based batteries (ARZBs) are promising candidates for next-generation grid storage and battery-buffered charging stations due to their high level of safety, low-cost, high-power density, and many other advantages. Researchers have developed various ARZBs, including Zn-ion batteries, alkaline Zn-based batteries, Zn-based redox flow batteries, etc. These include the zinc-iodine ($Zn\text{—}I_2$) redox flow battery which uses a $ZnI_2$ aqueous solution as an electrolyte and has attracted much attention. This battery offers impressive theoretical capacity (211 mAh $g_{iodine}^{-1}$, 820 mAh $g_{zinc}^{-1}$) and energy density (322 Wh $L^{-1}$) owing to the high solubility of $ZnI_2$ (up to 7 M) and multi-electron conversion reactions during charge/discharge. During charging, metallic zinc is electrodeposited on the anode ($Zn^{2+}+2e^-\rightarrow Zn$), while the slightly soluble iodine is generated on the cathode and spontaneously transformed into highly soluble triiodide ($I^{3-}$) ions with the presence of iodide ($I^-$) ions ($2I^-\rightarrow I_2+2e^-$; $I_2+I^-\rightarrow I_3^-$). The reverse reactions occur during discharging.

In recent years, static $Zn\text{—}I_2$ batteries (ZIBs) have been developed to overcome critical intrinsic drawbacks of flow batteries, such as bulky, complex cell configuration and low overall energy density due to the need for supporting equipment. However, a major challenge for both static and flow ZIBs is the self-discharge caused by the shuttling of $I_3^-$ ions to the zinc anode, which can potentially cause low Coulombic efficiency (CE). A common strategy to address this issue is to physically block the $I_3^-$ shuttling by using an ion selective membrane (ISM) as a separator (e.g., anion exchange membranes such as Nafion). However, the incorporation of ISMs substantially increases the device cost and inner resistance. One option that avoids using expensive ISMs involves encapsulating $I_2$ in microporous carbon and using a non-$ZnI_2$ solution as the electrolyte. In such cases, $I_2/I^-$ conversion reactions are confined inside micropores, while the generation and shuttling of $I^{3+}$ do not occur due to the absence of $I^-$ in the aqueous electrolyte (e.g., $ZnSO_4$). Although this model results in high CE, the device's total capacity and energy density are compromised because of the limited $I_2$ loading in the microporous carbon. Other batteries utilize a water-in-salt electrolyte to achieve surface heterogeneous ($I_2/I^-$) conversion reactions without the need for ISMs. Despite the greatly enhanced CE, the highly concentrated electrolyte had high viscosity and low conductivity, limiting the highest charge/discharge rate to 300 µA $cm^{-2}$. Thus, this is not favorable for practical high-power applications. Therefore, there is a need for static $Zn\text{—}I_2$ battery that retains a high CE in aqueous $ZnI_2$ electrolyte without the use of ISMs or other similarly expensive components.

SUMMARY

Aqueous rechargeable zinc-iodine batteries (ZIBs) are considered as promising candidates for grid energy storage due to their high energy density, low cost, and good safety. However, shuttling of highly soluble triiodide ions ($I_3^-$) to the anode lowers the Coulombic efficiency (CE), which hinders the commercialization of such batteries. The present disclosure provides a ZIB having a double-layered cathode that includes a conductive layer (CL) coupled to an adsorptive layer (AL). This cathode structure enables the formation and reduction of adsorbed $I_3$— ions at the conductive layer/adsorptive layer interface, thereby suppressing shuttling of the $I_3^-$ ions. A prototypical ZIB may use carbon cloth as the conductive layer and carbon-cloth-loaded polypyrrole (PPy) as the adsorptive layer simultaneously achieves outstanding Coulombic efficiency (up to 95.6%) and voltage efficiency (up to 91.3%) in aqueous $ZnI_2$ electrolyte even at high-rate intermittent charging/discharging, without the need of ion selective membranes. The double-layered cathode according to the present disclosure may be incorporated into design and fabrication of practical ZIBs and other batteries based on conversion reactions. As used herein, the term "about" denotes a range of ±5% of the stated value.

According to one embodiment of the present disclosure, a cathode for a zinc-iodine redox flow battery is disclosed. The cathode includes a first layer formed from a conductive material, and a second layer in contact with the first layer, where the second layer adsorbs a triiodide ion and where the triiodide ion is reduced at an interface between the first layer and the second layer.

Implementations of the above embodiment may include one or more of the following features. According to one aspect of the above embodiment, the first layer may include a two-dimensional carbon structure. The two-dimensional carbon structure may be one of a carbon fiber cloth or graphene. The second layer may include at least one of polypyrrole, polyaniline, or poly(3,4-ethylenedioxythiophene). The second layer may include a polypyrrole film deposited on a two-dimensional carbon structure. The polypyrrole film may be electro-polymerized onto a carbon fiber cloth or graphene. Electro-polymerization of the polypyrrole film may be carried out in about 10 cycles to about 300 cycles. The polypyrrole film may be deposited onto the two-dimensional carbon structure at a concentration from about 1.00 mg/$cm^2$ to about 10.00 mg/$cm^2$. The polypyrrole film may be deposited onto a two-dimensional carbon structure at a concentration of about 1.48 mg/$cm^2$, 2.88 mg/$cm^2$, 5.23 mg/$cm^2$, or 9.56 mg/$cm^2$. The second layer includes an organic polymer.

According to another aspect of the above embodiment, a battery may include the cathode and a zinc anode. The battery may include an aqueous electrolyte solution including iodine.

According to another embodiment of the present disclosure, a method of making a cathode for use in a zinc iodine redox flow battery is disclosed. The method also includes electro-polymerizing an organic polymer film onto an electroconductive structure to form an adsorptive layer on the electroconductive structure; and contacting the adsorptive layer to a conductive layer to form the cathode.

Implementations of the above embodiment may include one or more of the following features. According to one aspect of the above embodiment, the electroconductive structure may include a two-dimensional carbon structure. The electroconductive structure may include a carbon fiber cloth or graphene. The method may include electro-polymerizing the organic polymer film onto the electroconductive structure using a counter electrode and a reference electrode. The counter electrode may be a graphite and the reference electrode includes saturated calomel. The electro-polymerizing occurs in a solution, which may include 0.1 m pyrrole and 0.05 m sulfuric acid. The electro-polymerizing may be performed from about 30 cycles to about 240 cycles. The organic polymer film includes at least one of polypyrrole, polyaniline, or poly(3,4-ethylenedioxythiophene).

According to a further embodiment of the present disclosure, a battery is disclosed. The battery includes an aqueous electrolyte solution including zinc-iodine; a zinc anode; and a double-layered cathode having: a conductive substrate, and an adsorptive layer disposed over the conductive substrate.

Implementations of the above embodiment may include one or more of the following features. According to one aspect of the above embodiment, the conductive substrate includes carbon. The adsorptive layer includes a conductive polymer. The conductive polymer is selected from the group may include of polypyrrole, polyaniline, poly(3,4-ethylenedioxythiophene), and combinations thereof. The conductive polymer has a loading of from about 1.00 mg/cm$^2$ to about 10.00 mg/cm$^2$ of the adsorptive layer.

According to yet another embodiment of the present disclosure, a method for manufacturing a double-layered cathode for use in an aqueous rechargeable zinc-iodine battery is disclosed. The method includes placing a conductive substrate, a reference electrode, and a counter electrode in an aqueous solution having a monomer. The method also includes applying an electrical potential for at least one cycle between the reference electrode and the conductive substrate to form a conductive polymer on the conductive substrate thereby forming the double-layered cathode; and contacting the adsorptive layer to a conductive layer to form the double-layered cathode.

Implementations of the above embodiment may include one or more of the following features. According to one aspect of the above embodiment, the electrical potential is applied from about 10 cycles to about 300 cycles. The electrical potential may be applied until the conductive polymer is present from about 1.00 mg/cm$^2$ to about 10.00 mg/cm$^2$ on the conductive substrate.

BRIEF DESCRIPTION OF DRAWINGS

Various embodiments of the present disclosure are described herein below with reference to the figures wherein:

FIG. 2A shows scanning electron microscope (SEM) images at 50 μm and 5 μm (inset) magnifications of a double-layered cathode (CC-PPy-30) formed after 30 cycles of electro-polymerization of polypyrrole (PPy) on a carbon cloth (CC) substrate according to the present disclosure;

FIG. 2B shows SEM images at 50 μm and 5 μm (inset) magnification of CC-PPy-60 adsorptive layer according to the present disclosure;

FIG. 2C shows SEM images at 50 μm and 5 μm (inset) magnification of CC-PPy-120 adsorptive layer according to the present disclosure;

FIG. 2D shows SEM images at 50 μm and 5 μm (inset) magnification of CC-PPy-240 adsorptive layer according to the present disclosure;

FIG. 14 is a schematic illustration of the anion exchange mechanisms of the PPy and A-$I_3^-$ conversion reactions;

DETAILED DESCRIPTION

Figure 1:
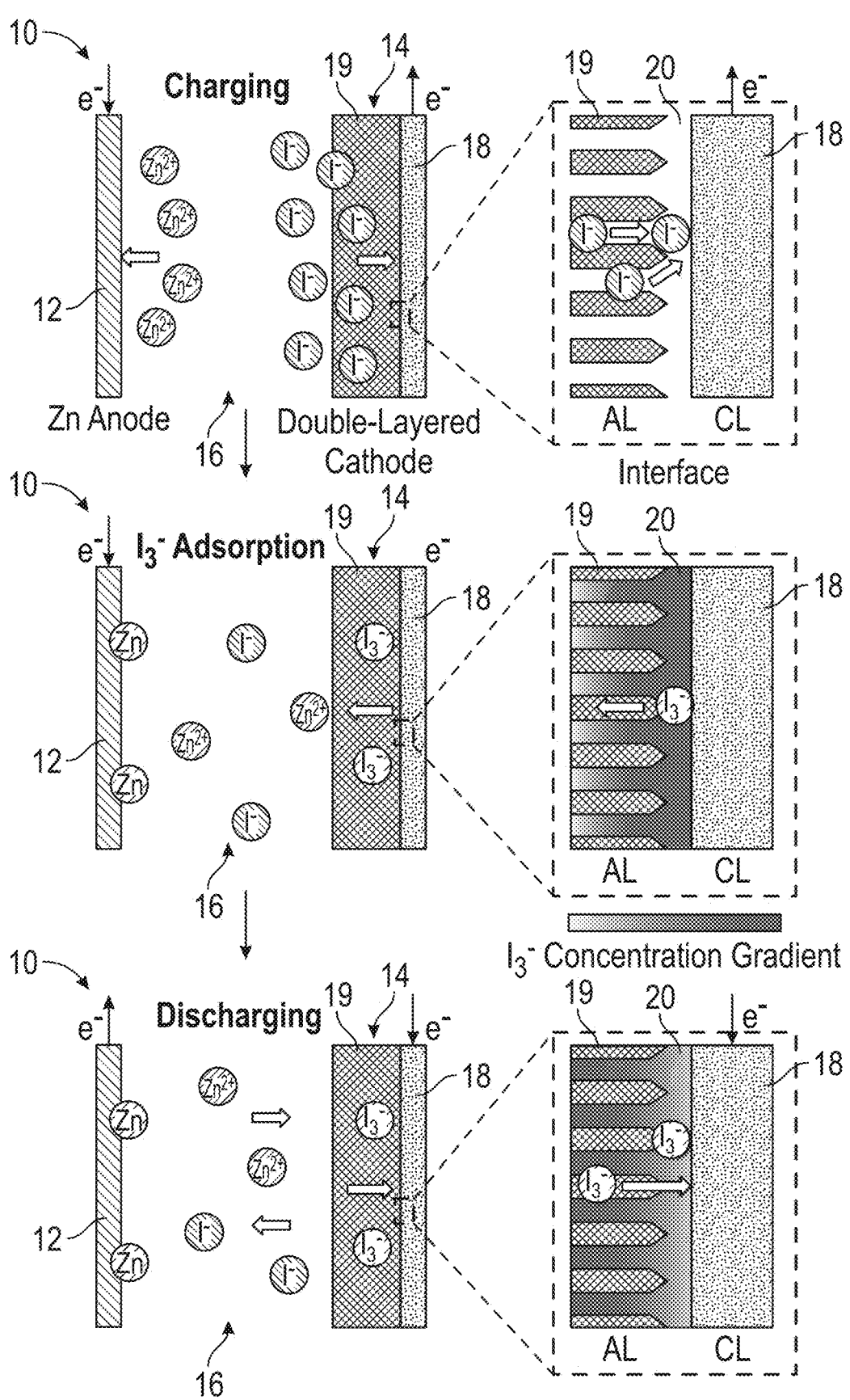
FIG. 1 is a set of schematic illustrations of zinc-iodine battery (ZIB) according to an embodiment of the present disclosure with a double-layered cathode having an adsorptive layer (AL) and a conductive layer (CL) with dashed boxes illustrating reactions taking place at a layer interface between the adsorptive layer and the conductive layer.

The present disclosure provides an aqueous rechargeable zinc-iodine battery (ZIB) 10. FIG. 1 shows a the ZIB 10 through charging and discharging processes. The ZIB 10 includes a zinc anode 12 and a double-layered cathode 14, which are submerged in an aqueous electrolyte solution 16. The electrolyte solution 16 is an aqueous solution of zinc iodide ($ZnI_2$) having $I^-$ and $I_{3-}$ ions. The double-layered cathode 14 includes a conductive layer 18 formed from a conductive material and an adsorptive layer 19 in contact with the conductive layer 18. The conductive layer 18 acts as a cathodic current collector and may be formed from any suitable conductive material such as a two-dimensional carbon structure, which may be carbon cloth (CC) or graphene. The adsorptive layer 19 may be formed from a conductive polymer coating disposed on a conductive substrate, which may be the same or different from the material of the conductive layer 18. The conductive polymer coating has good adsorption capability of $I_{3-}$ ions, namely, allowing for both physical and chemical interaction of $I_{3-}$ ions with the conductive layer 18. Suitable conductive polymers include polypyrrole (PPy), polyaniline (PANi), poly(3,4-ethylenedioxythiophene) (PEDOT), and combinations thereof. The conductive polymer may be deposited at a concentration of from about 1.00 mg per $cm^2$ on the conductive substrate to about 10.00 mg/$cm^2$.

The adsorptive layer 19 may be formed using galvanostatic electro-polymerization of the conductive polymer on the conductive substrate, which may also be carbon cloth (CC) or graphene. In particular, a three-electrode system in aqueous sulfuric acid may be used to form the adsorptive layer 19. An aqueous electro-polymerization solution may be formed with the co-polymer or monomer (e.g., pyrrole) being present at a concentration of about 0.1 M and an acid, e.g., sulfuric acid, present at a concentration of about 0.05 M. The three-electrode system includes a counter electrode, which may be formed from graphite, platinum, indium tin oxide coated glass, gold, or any other suitable material. The three-electrode system also includes a reference electrode, which may be a saturated calomel electrode (e.g., Ag/AgCl, etc.). The third electrode is a working electrode, namely, the conductive substrate used in forming the adsorptive layer 19. Three electrodes are submerged in the aqueous solution of the monomer and an electrical potential is applied in between the reference electrode and the conductive substrate. The electrical potential may be constant or varied and may be from about −0.2 V to about +1.0 V with respect to the reference electrode. The electro-polymerization may be carried out for about 10 cycles to about 300 cycles, and in embodiments, from about 30 cycles to about 240 cycles.

The battery 10 may be charged and discharged a plurality of times. During charging, the oxidation of $I^-$ occurs at an interface 20 between the conductive layer 18 and the adsorptive layer 19 (i.e., where the conductive layer 18 contacts the adsorptive layer 19). The $I^-$ ions in the electrolyte solution 16 transfer electrons to the conductive layer 18 and spontaneously form adsorbed $I_3^-$ ions (denoted as A-$I_3^-$) at the interface 20 between the conductive layer 18 and the adsorptive layer 19. These A-$I_3^-$ ions subsequently diffuse into the bulk structure of the adsorptive layer 19 due to the concentration gradient and thus re-expose the interfacial adsorption sites so that they can accept newly formed $I_3^-$ ions. During discharging, the dominant A-$I_3^-$ ions are reduced at the interface 20 between the conductive layer 18 and the adsorptive layer 19 to form $I^-$ ions. Therefore, the presence of an adsorptive layer 19 effectively suppresses the $I_3^-$ shuttling effect. The conducting polymer of the adsorptive layer 19 allows for both physical and chemical interactions with $I_3^-$ ions. $I_3^-$ ions, which tend to chemically interact with many other polymers by bonding with cations.

The following Examples illustrate embodiments of the present disclosure. These Examples are intended to be illustrative only and are not intended to limit the scope of the present disclosure. Also, parts and percentages are by weight unless otherwise indicated. As used herein, "room temperature" or "ambient temperature" refers to a temperature from about 20° C. to about 25° C. and "standard pressure" refers to a pressure about 1 atm. Unless stated otherwise, the Examples were performed at ambient temperature and standard pressure.

Example 1

This example describes synthesis of double-layered cathodes according to the present disclosure.

A double-layered cathode was prepared using CC as the conductive layer and CC electrodeposited with a PPy film (denoted as CC-PPy) as the adsorptive layer. The static ZIBs equipped with the double-layered cathode were tested in $ZnI_2$ aqueous electrolyte. This combination resulted in significantly improved Coulombic efficiency (CE) (up to 95.6%) over negative controls at different charging/discharging rates, confirming that the self-discharge caused by $I_3^-$ shutting was mostly suppressed. Using a combination of experimental methods and simulations, it is disclosed herein how iodine species interact with PPy during charging/discharging and consequently affects the CE and charge/discharge voltages of ZIBs.

The CC-PPy adsorptive layers were prepared by galvanostatic electro-polymerization of pyrrole on a carbon cloth substrate using a three-electrode system in aqueous sulfuric acid electrolyte. Adsorptive layer samples with different PPy loadings all had a uniform and compact PPy film wrapping on carbon fibers of CC as shown in SEM images of 30, 60, 120, and 240 cycle electro-polymerized CC-PPy in FIGS. 2A-D, respectively. The resulting double-layered cathodes were used to assembled the ZIBs for evaluation.

All chemicals were of analytical grade and directly used without further purification. Polypyrrole (PPy) film was electro-polymerized on carbon cloth (CC) substrate using a three-electrode system in a solution of 0.1 M pyrrole and 0.05 M sulfuric acid. A graphite rod and saturated calomel electrode were used as the counter and the reference electrodes, respectively. Before electro-polymerization, the CC was immersed in the solution (effective area: $1.0 \times 1.0$ cm$^2$) and degassed in vacuum at room temperature until no air bubbles were released. The electro-polymerization was conducted using a pulse current method. In one deposition cycle, the current density was kept at 2 mA cm$^{-2}$ for 1 min and then subjected to an open circuit for about 10 seconds to allow uniform redistribution of pyrrole. This deposition step was repeated to increase the mass loading of PPy. As noted above, the composite adsorptive layers were denoted as CC-PPy-x, where x represents the number of cycles for electro-polymerization. The samples were washed with deionized water and ethanol, and then vacuum dried overnight at room temperature. The average mass loadings of PPy was about 1.48 mg/cm$^{-2}$ for CC-PPy-30, about 2.88 mg/cm$^{-2}$ for CC-PPy-60), about 5.23 mg/cm$^{-2}$ for CC-PPy-120), and about 9.56 mg/cm$^{-2}$ for CC-PPy-240.

Example 2

This example describes electrical properties of the ZIBs of Example 1.

Figure 3:
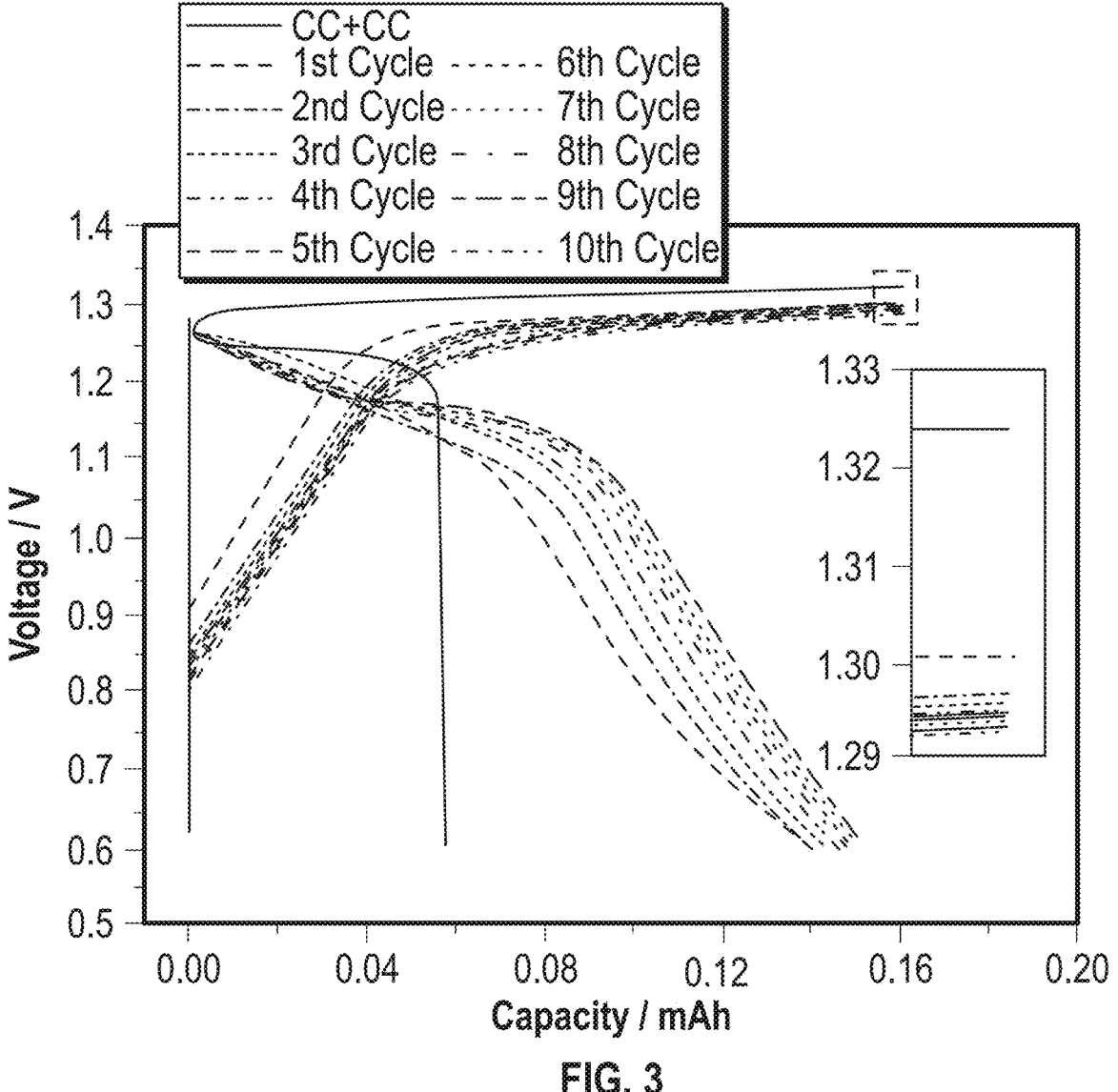
FIG. 3 shows voltage profile plots obtained at about 0.5 C of a control bare cathode (CC+CC) and a cathode having an adsorptive layer of FIG. 2C of the first 10 charge/discharge cycles with the inset showing the magnified view of charging voltages highlighted in the dashed box.
Figure 4:
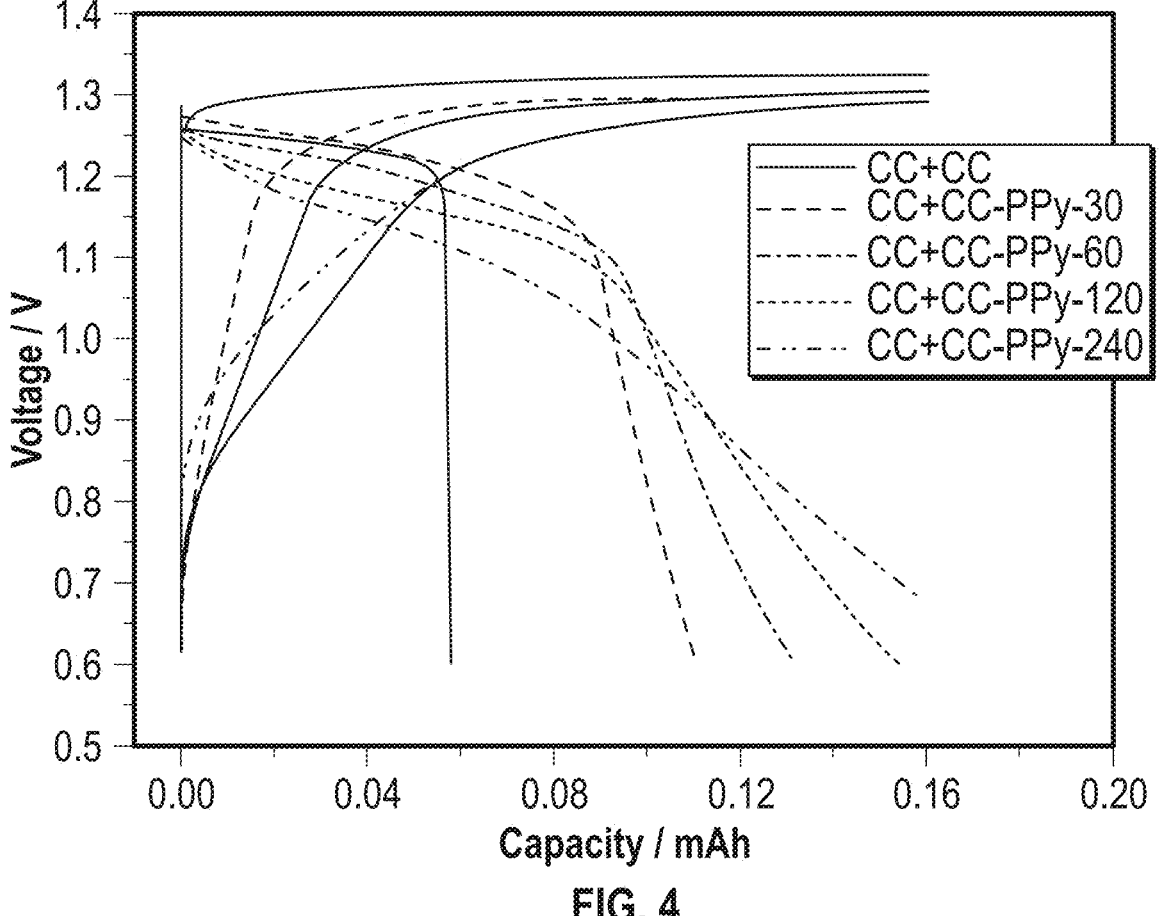
FIG. 4 shows voltage profiles obtained at about 0.5 C of CC+CC, a cathode having an adsorptive layer of FIG. 2A (CC+CC-PPy-30), a cathode having an adsorptive layer of FIG. 2B (CC+CC-PPy-60), a cathode having an adsorptive layer of FIG. 2C (CC+CC-PPy-120), and a cathode having an adsorptive layer of FIG. 2D (CC+CC-PPy-240)

Galvanostatic charge/discharge (GCD) tests with a fixed depth of charge (10%, 0.16 mA h) at about 0.5 C were conducted. The ZIB configuration used in this experiment used carbon fiber cloth as the conductive layer and CC-PPy-120 as the adsorptive layer (denoted herein as CC+CC-PPy-120). A control sample with bare carbon cloth (CC) as both the conductive layer and the adsorptive layer (denoted as CC+CC herein) was used as a comparison. Both ZIBs had comparable electrolyte usage and interfacial resistance. The voltage profiles of the first 10 consecutive GCD cycles are illustrated in FIG. 3. In the presence of the PPy-coated adsorptive layer, the CE of the ZIB was significantly enhanced relative to the 36.2% of the CC+CC configuration to 95.5% (CC+CC-PPy-120, the 10th cycle). This finding illustrates that the PPy coating effectively trap and adsorb soluble $I_3^-$ ions generated during charging. In contrast, the CC+CC configuration failed to localize $I_3^-$ ions by adsorption, because CC has effectively no adsorption capability for $I_3^-$ ions. It is noteworthy that the enhancement of CE is directly correlated to the loading of PPy as illustrated in the voltage plots of FIG. 4, with capacity increasing with the loading, due to the number of cycles of electro-polymerization. However, the inner resistance of the cathode also increased with the loading of PPy as indicated in the plots FIG. 4. Among the different configurations, the CC-PPy-120 adsorptive layer was shown to optimally balance CE and inner resistance.

The GCD results also provided important information for understanding the mechanisms of the CE enhancement and the role of PPy coating during charging/discharging. As shown in FIG. 3, the CE of CC+CC-PPy-120 increased over the first 10 cycles (1st cycle: about 89.4%, 2nd cycle: about 87.5%, 10th cycle: about 95.5%), indicating possible transformations of the PPy materials. The evolution of charging/discharging voltages gives additional information of the possible PPy transformations.

Figures 5, 6:
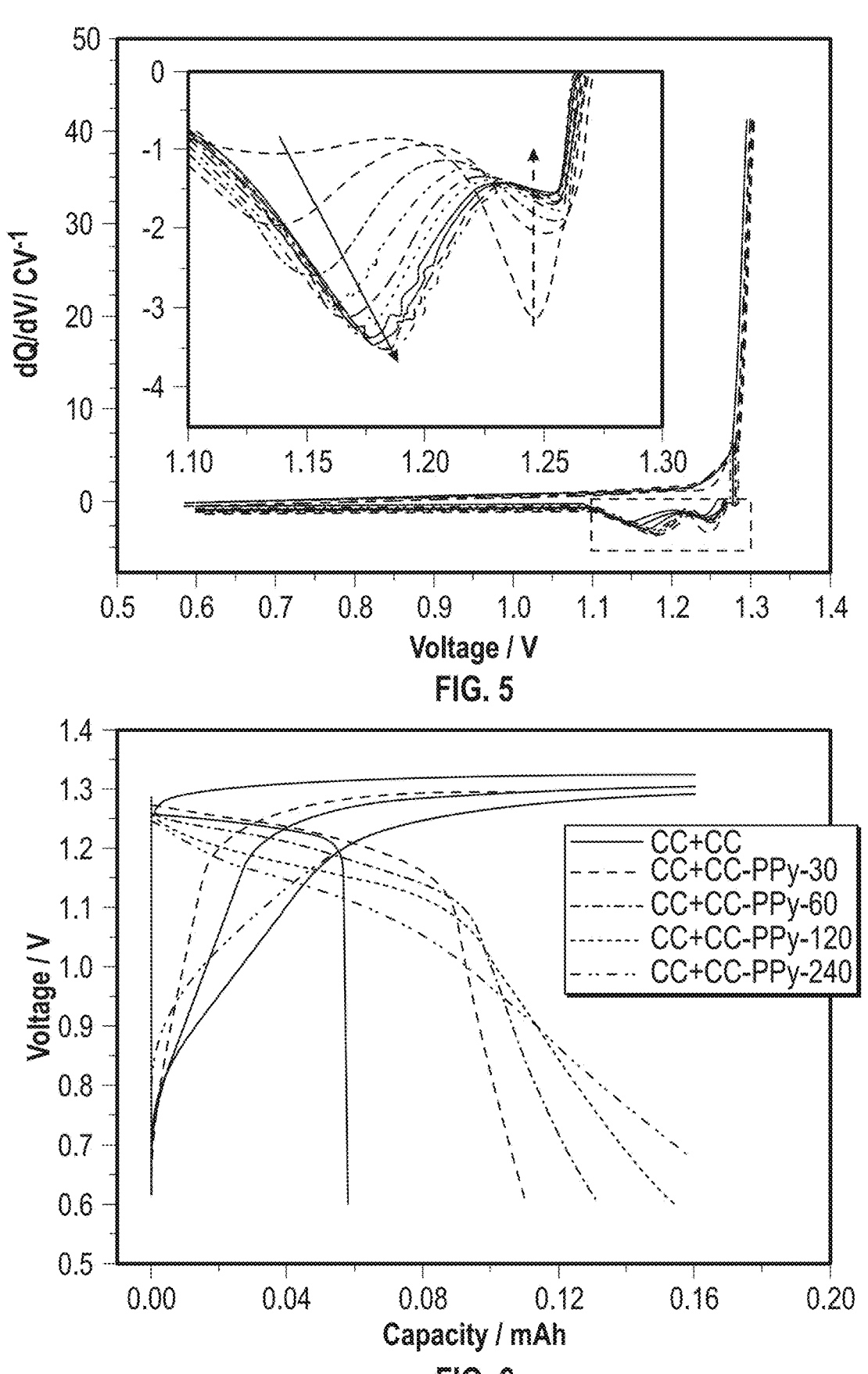
FIG. 5 is a differential capacity plot of CC+CC-PPy-120 collected at about 0.5 C with an inset shows the magnified view of discharging voltages highlighted in the dashed box.
FIG. 6 shows voltage profile plots obtained at about 0.5 C of CC+CC, CC+CC-PPy-30, CC+CC-PPy-60, CC+CC-PPy-120, and CC+CC-PPy-240.
Figures 7, 8:
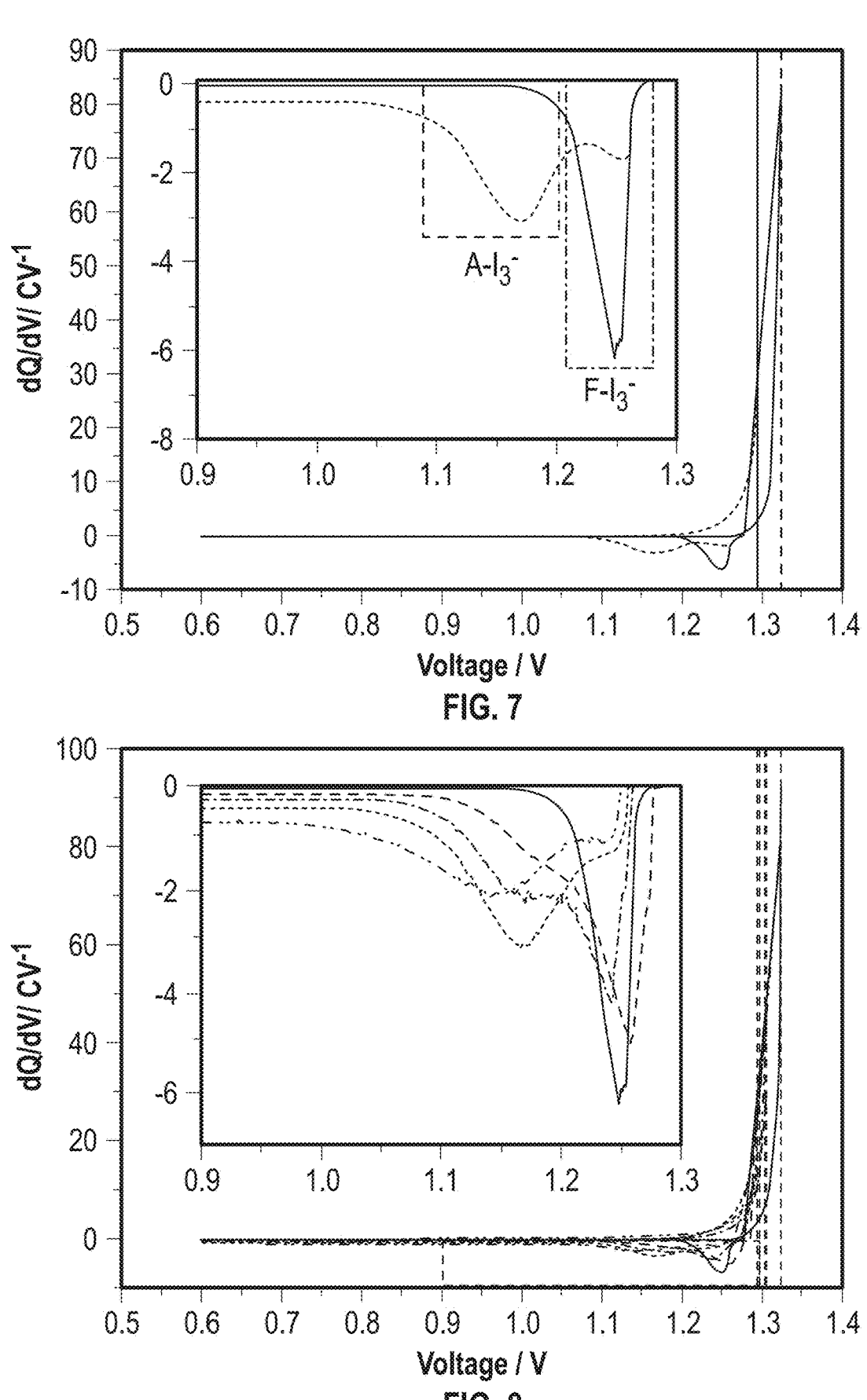
FIG. 7 shows differential capacity plot of CC+CC and CC+CC-PPy-120 (10th cycle) with the dashed lines representing charging voltages and an inset figure showing the magnification of discharging voltages highlighted in the dashed box.
FIG. 8 shows a differential capacity plots obtained at about 0.5 C of CC+CC, CC+CC-PPy-30, CC+CC-PPy-60, CC+CC-PPy-120, and CC+CC-PPy-240 with the dashed lines representing charging voltages and an inset figure showing the magnification of discharging voltages highlighted in the dashed box.

Differential capacity plot of FIG. 5 was derived from the voltage profiles of CC+CC-PPy-120 of FIG. 3, which was employed to precisely identify the respective voltages of charge/discharge plateaus by transforming them into distinguishable peaks. The higher the peak intensity, the flatter the voltage plateau and therefore the higher concentration of the respective redox species. In terms of the charging voltages, CC+CC exhibited a charging plateau at around 1.32 V as shown in FIG. 3. In comparison, CC+CC-PPy-120 had a slightly lower charging plateau voltage at around 1.30 V in the first cycle, and then voltage gradually decreases and stabilizes over cycles to 1.29 V. This charging voltage at around 1.30 V was also observed in all the ZIBs using PPy adsorptive layers as shown in the differential capacity plots of FIG. 6. For the discharging voltages, the differential capacity plots of FIG. 7 shows that CC+CC had a single discharging peak at around 1.25 V, while the CC-PPy-120 adsorptive layer has two discharging peaks. One of the two peaks locates at around 1.25 V, and its peak position stayed rather constant while the peak signal gradually decreases over cycles. The other discharge peak gradually increases from 1.13 V to 1.18 V over cycles accompanied with the increase of peak intensity. This extra discharging peak also observed in the ZIBs using adsorptive layers differential capacity plots of CC+CC, CC+CC-PPy-30, CC+CC-PPy-60, CC+CC-PPy-120, and CC+CC-PPy-240 of FIG. 8.

Figures 9A, 9B, 9C:
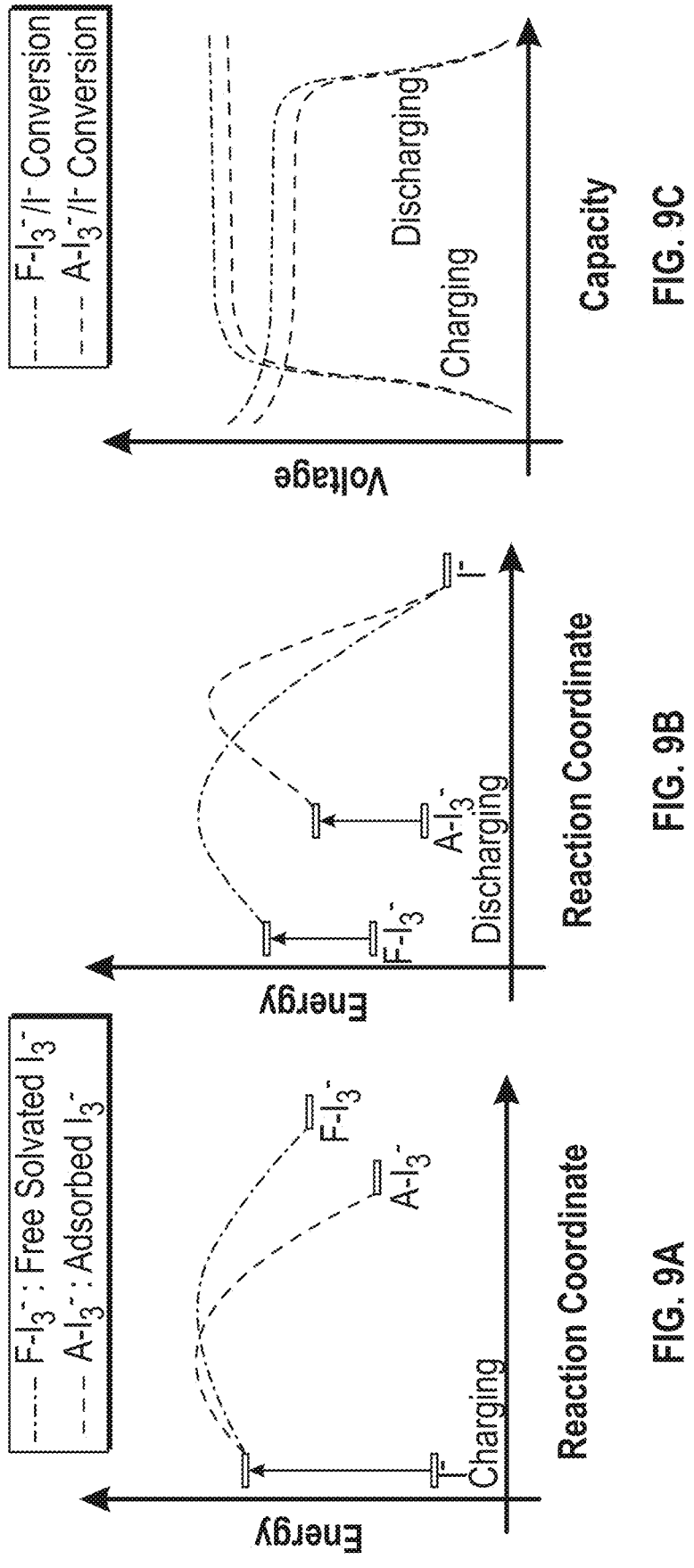
FIGS. 9A-C show a set of schematic illustrations of the proposed energy profiles of $I_3^-/I^-$ conversions during charging (FIG. 9A), discharging (FIG. 9B), and galvanostatic charge/discharge curves of F—$I_3$-$I^-$ and A-$I_3$—/$I^-$ conversions (FIG. 9C)

Based on the evolution of CE and voltage, the charging/discharging processes of CC+CC-PPy-120 involve (1) free solvated $I_3^-$ (denoted as F—$I_3$—) and (2) PPy-adsorbed $I_3$-(denoted as A-$I_3$—). A-$I_3$— is expected to be more stable and, thus, has lower Gibbs free energy of formation than that of F—$I_3$— as illustrated in the proposed energy profiles of $I_3^-/I^-$ of FIGS. 9A-C. This model explains why CC+CC-PPy-120 has a lower charging voltage than CC+CC and exhibits an extra discharging peak at lower voltage as shown in the voltage profile plots FIG. 3 and the differential capacity plots of FIG. 7. The lower charging voltage is due to the generation of A-$I_3$—, which is thermodynamically favorable and its reduction is thermodynamically unfavorable compared to F—$I_3$—. There is a negligible change of the F—$I_3$— discharging voltage of CC+CC-PPy-120 over cycles because both the formation and reduction of F—$I_3$— occur on the stable CC surface as illustrated by the differential capacity plot of FIG. 5.

To gain a understanding of the mechanism, the locations in which formation and reduction of A-$I_3$— on CC+CC-PPy-120 take place was determined. If F—$I_3$— generates on CC conductive layer first, diffuses to the CC-PPy adsorptive layer and is then adsorbed by PPy to form the A-$I_3$—, CC+CC-PPy-120 is expected to have the same charging voltage as CC+CC (1.32 V). Likewise, if A-$I_3$— desorbs from the CC-PPy AL to form F—$I_3$— and then diffuses to CC conductive layer and is reduced there, CC+CC-PPy-120 should have the same discharging voltage (1.25 V) as CC+CC. However, neither case was observed. As shown in the differential capacity plots of FIG. 8, all ZIBs with CC-PPy adsorptive layers not only had a lower charging voltage than the CC+CC ZIB, but also exhibited an extra discharging peak at a lower voltage. Therefore, (without being bound by theory) it was concluded that the formation and reduction of $A-I_3^-$ occurs at the interface of the CC conductive layer and the PPy+CC adsorptive layer.

During charging, the $I^-$ ions migrate from the bulk electrolyte solution, transfer electrons to the conductive layer and then spontaneously form $A-I_3^-$ by combining $I^-$ ions and oxidized $I_2$ at the interface between the conductive layer and the adsorptive layer. The generated $A-I_3^-$ ions will subsequently migrate into the bulk structure of the adsorptive layer due to the concentration gradient and re-expose adsorption sites for other $I_3^-$ ions. During discharging, $A-I_3^-$ ions will diffuse from the bulk adsorptive layer to the conductive layer/adsorptive layer interface under a concentration gradient, accept electrons from the conductive layer to form I— ions, and finally migrate back to the bulk electrolyte.

Figure 10:
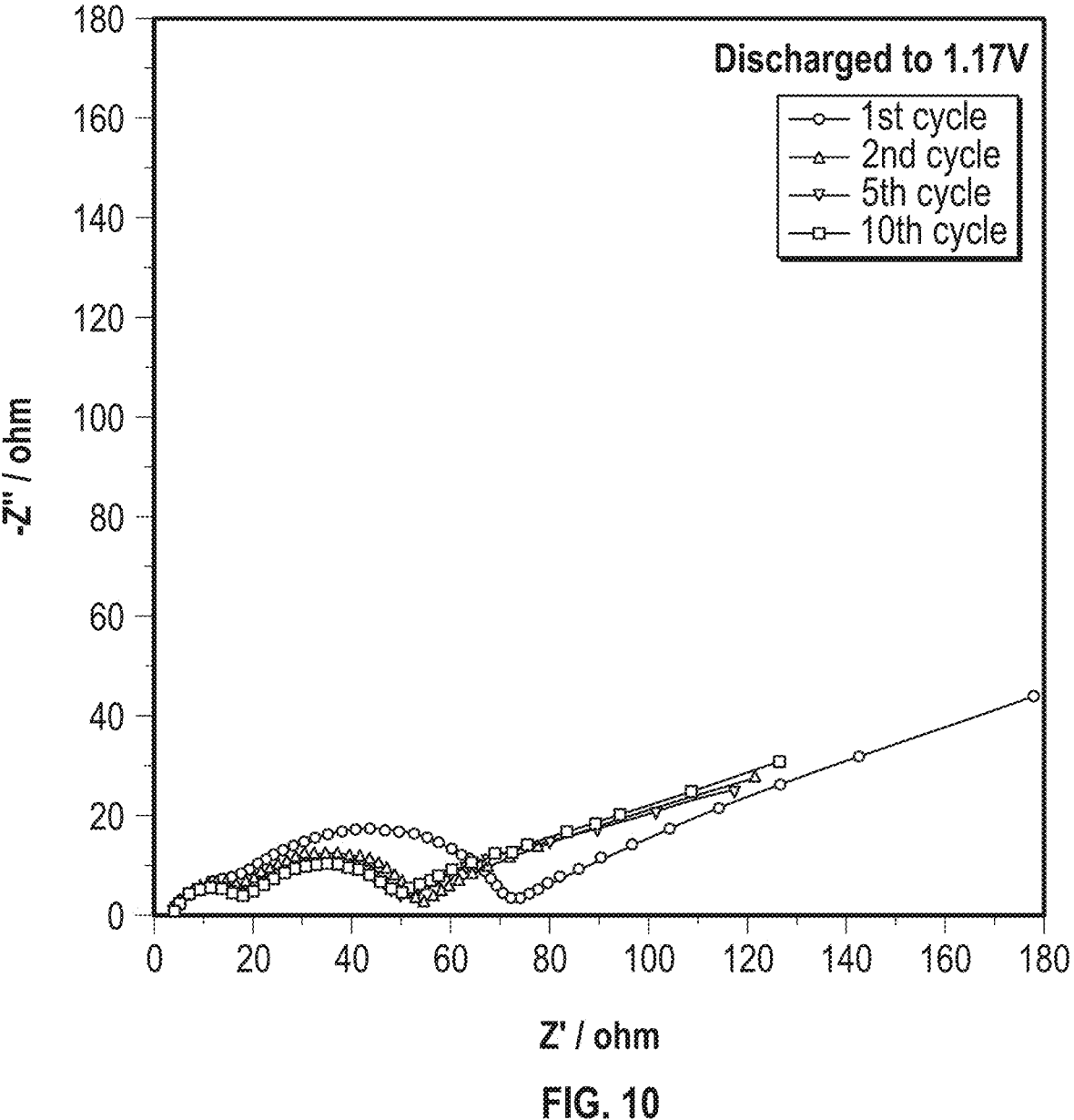
FIG. 10 is a graph showing electrochemical impedance spectra (EIS) data collected from CC+CC-PPy-120 at about 1.17 V over $1^{st}$, $2^{nd}$, $5^{th}$, and $10^{th}$ cycle.

Moreover, the increase of CE and the simultaneous decrease of charging voltage as illustrated in the voltage profile plots of FIG. 3 implies that the PPy coating undergoes a transformation over the charge/recharge cycles to enhance its interactions with I3-. As shown in differential capacity plots of FIG. 5, the signal corresponding to the reduction of $A-I_3^-$ increases (larger area means a higher amount of charges) over the cycles, while the signals of $F—I_3^-$ become lower. These results suggested that the formation of $A-I_3^-$ is more energetically favorable relative to formation of $F—I_3^-$ with an increasing $I_3^-$ adsorption capacity. Additionally, in contrast to the fixed discharging voltage of $F—I_3^-$, the positive shift of $A-I_3^-$ discharging voltage (see differential capacity plots FIG. 5) can be attributed to the facilitated reduction of $A-I_3^-$ at the conductive layer/adsorptive layer interface. Taken together, the charging/discharging voltage gap of $A-I_3^-$ narrows with additional cycles, illustrate that the kinetics of $A-I_3^-/I^-$ conversion improves over cycles (see energy profiles of FIGS. 9A-C). This was testified by the electrochemical impedance spectra (EIS) of ten consecutive GCD cycles collected at the discharging voltage of A-I3- (1.17 V) (see electrochemical impedance spectra (EIS) of FIG. 10). The equivalent circuit resistance (Rs) and charge transfer resistance of $Zn2+/Zn$ redox couple (Rct1) remained unchanged, while the charge transfer resistance of A-I3-/I- redox couple (Rct2) drastically decreased in the first few cycles and then reached a stable state (see fitted EIS data shown in FIG. 11). Once again, this result indicates a possible PPy transformation during the first few consecutive charge/discharge processes.

The capacitive behavior of PPy below 1.15 V was investigated. In this voltage window, CC+CC-PPy-120 exhibited constant slopes in its voltage profile (see CC+CC-PPy-120 voltage profile plot of FIG. 3), which correspond to the constant dQ/dV (capacitance) values, as shown in magnified differential capacity plot of CC+CC-PPy-120 of FIG. 12. The capacitance increases with the mass loading of PPy (see magnified differential capacity plots of FIG. 13). The capacitive behavior of PPy comes from the anion doping (charging) and de-doping (discharging) reaction, where the anions under the given voltage window are sulfate ions $(SO_4^{2-})$ from the as-prepared PPy and $I^-$ in the electrolyte. Given that $I^-$ ions are in excess in the solution, and they have smaller ionic size (0.216 nm) and have a lower charge than $SO_4^{2-}$ (0.230 nm), anion exchange takes place on PPy over the initial cycles. The capacitance signal at deep discharge voltage (0.6 V) can be attributed to the sluggish de-doping of $SO_4^{2-}$. The significant decrease of this capacitive signal in the initial cycles (highlighted by the vertical arrow in the bottom panel of FIG. 12 suggests the loss of $SO_4^{2-}$ upon discharging and the replacement by $I^-$ upon subsequent recharging. The negatively shifted onset charging voltage (highlighted by the horizontal arrow in the top panel of FIG. 12) also implies the PPy is re-doped by the kinetically more favorable $I^-$ instead of $SO_4^{2-}$.

Figures 11, 12:
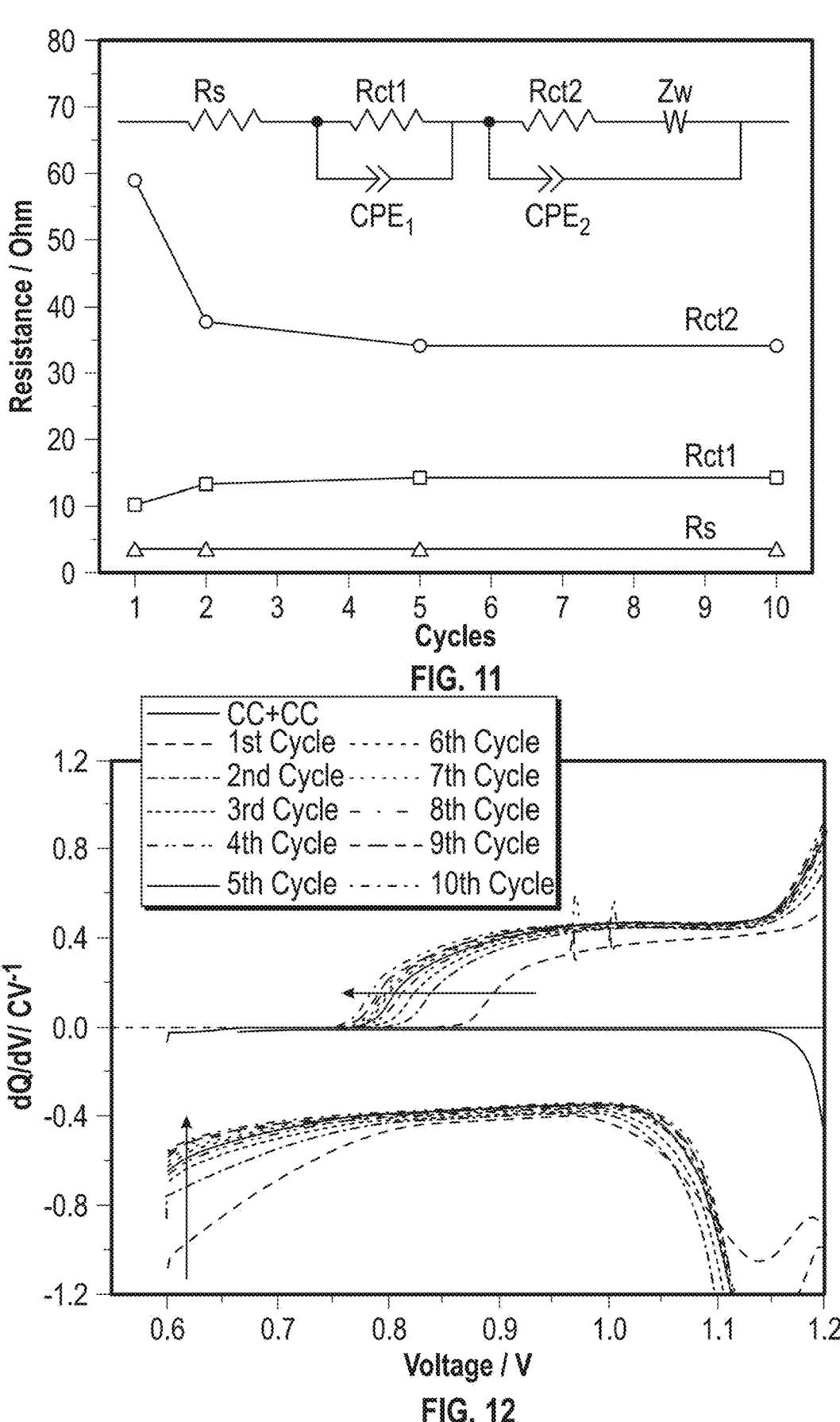
FIG. 11 shows the values of the elements from the fitted EIS data of FIG. 10 collected at about 1.17 V.
FIG. 12 is a magnified differential capacity plot of CC+CC and CC+CC-PPy-120 obtained in a capacitive voltage window at about 0.5 C.
Figure 13:
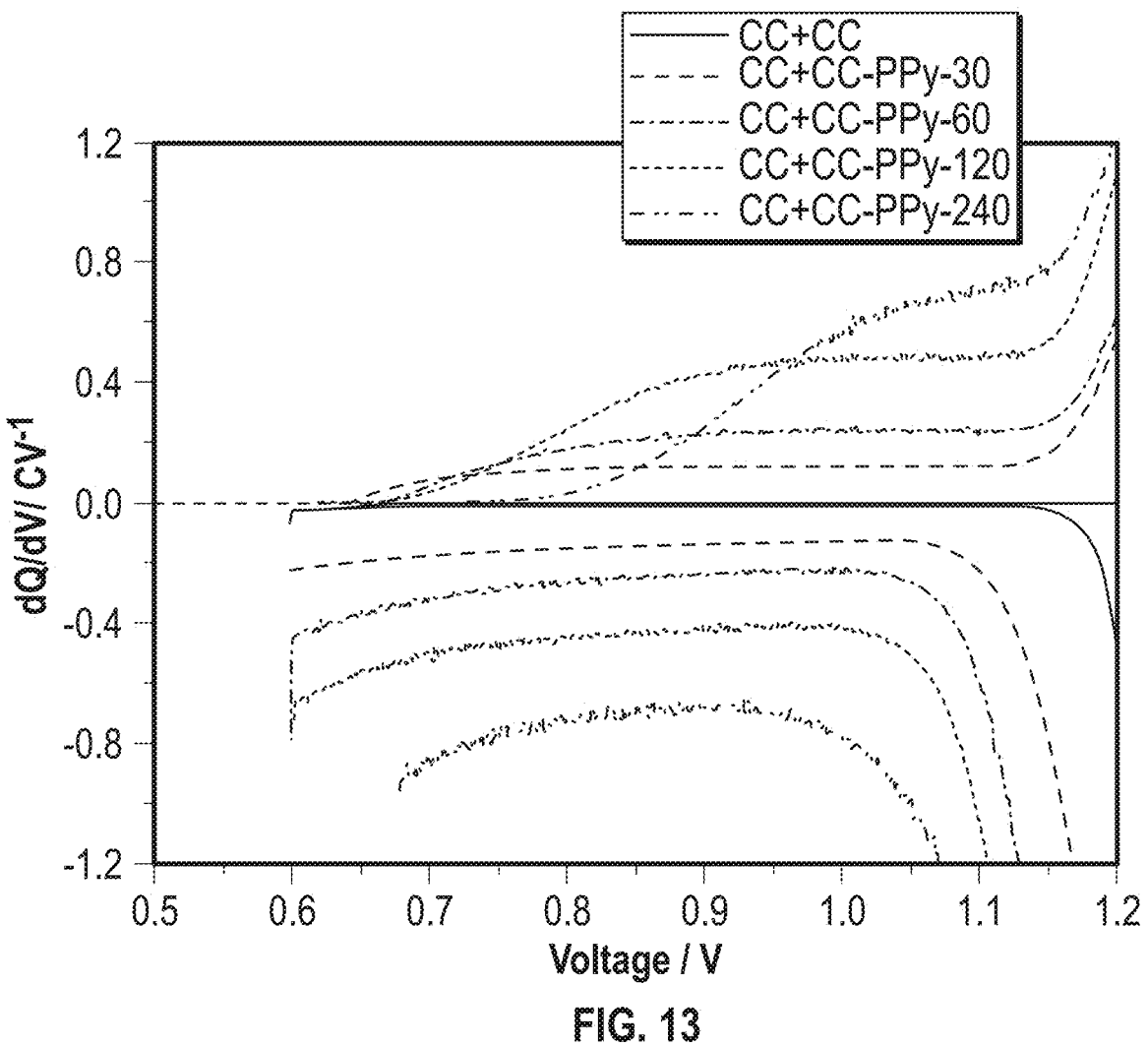
FIG. 13 is a magnified differential capacity plot of CC+CC, CC+CC-PPy-30, CC+CC-PPy-60, CC+CC-PPy-120, and CC+CC-PPy-240 obtained in the capacitive voltage window at about 0.5 C.
Figure 14:
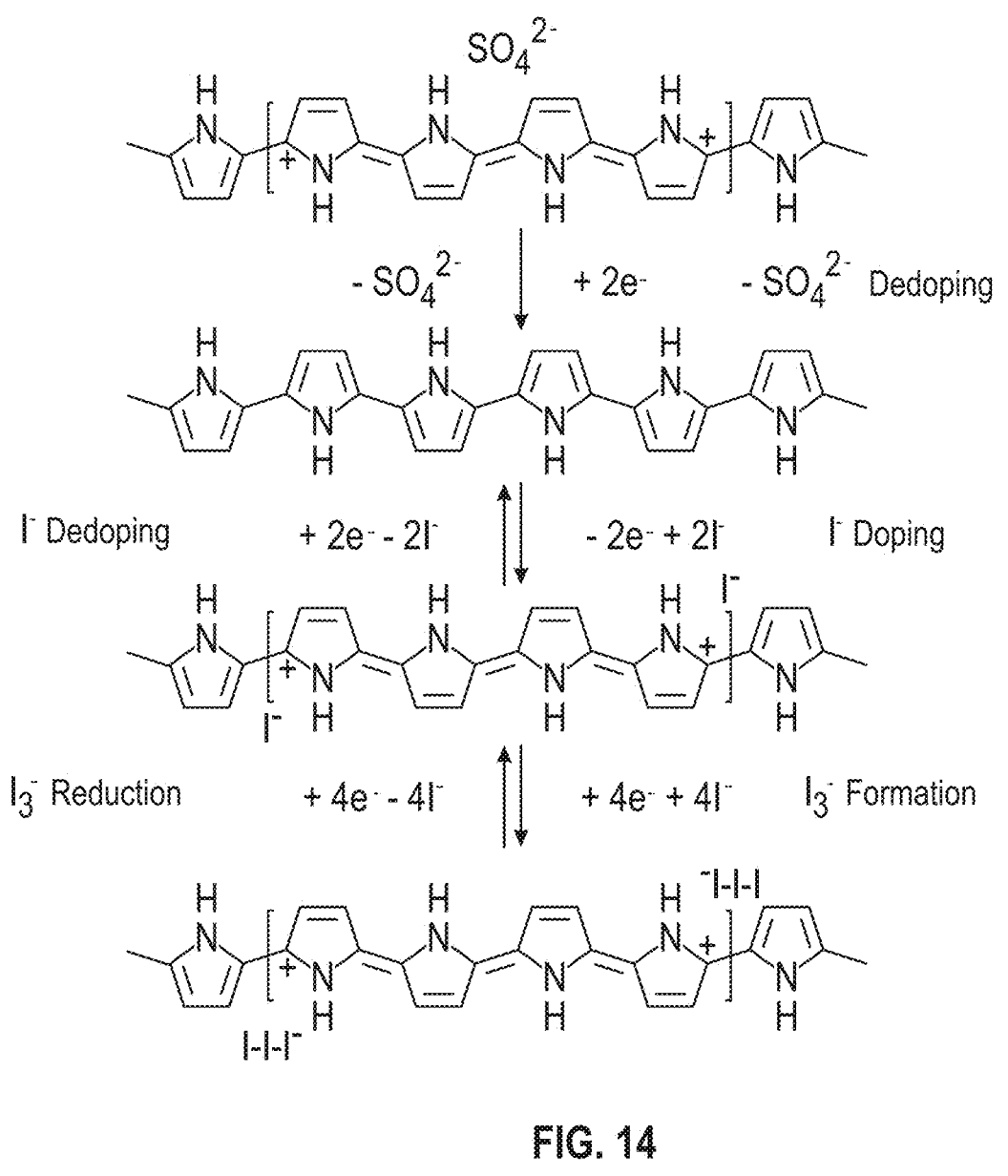
Figure 15:
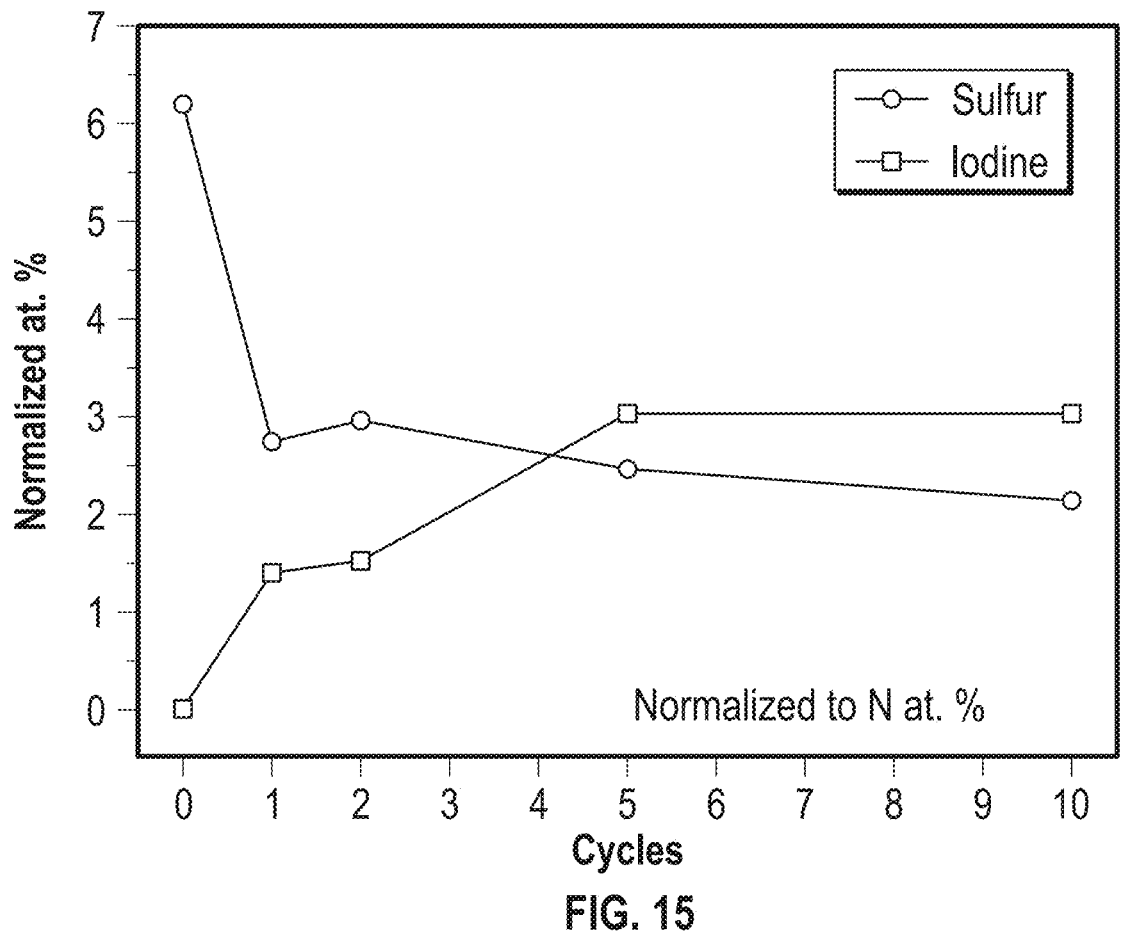
FIG. 15 is a graph showing the normalized atomic contents of sulfur and iodine on the CC-PPy-120 charged at 1.15 V plotted as a function of a number of cycles.
Figure 16:
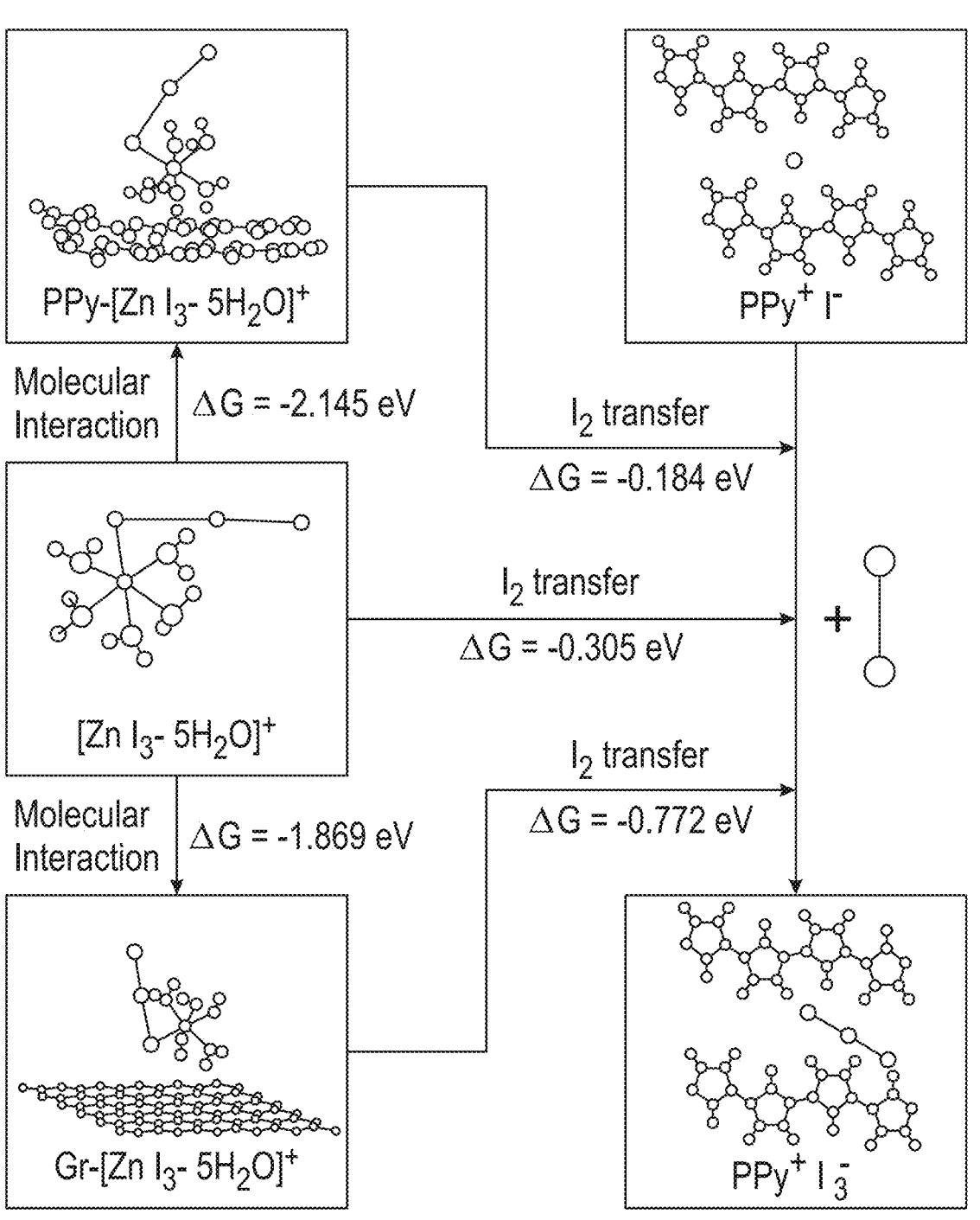
FIG. 16 shows density-functional theory (DFT) calculation results of the evolution processes of F—$I_3^-$ and A-$I_3^-$, including optimized geometric structures and Gibbs free energy changes.
Figure 17A:
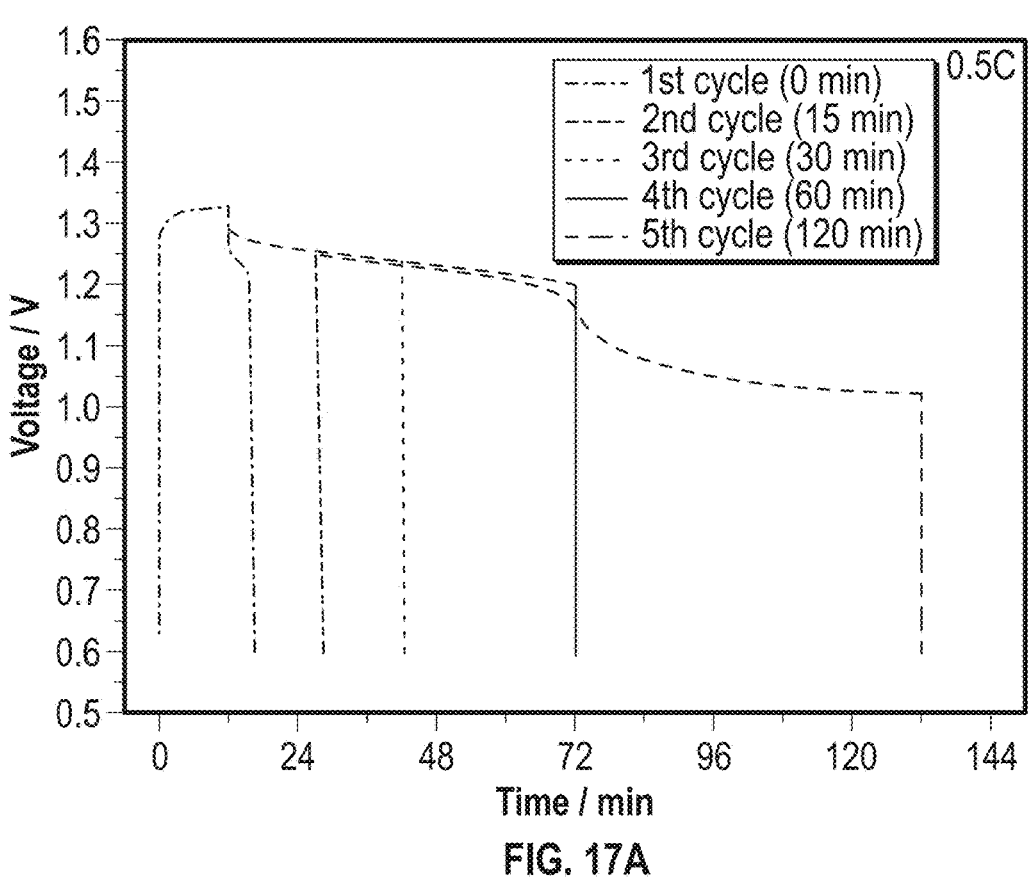
FIGS. 17A-D shows galvanostatic charge/discharge (GCD) curves obtained at about 0.5 C of CC+CC of $1^{st}$ to $5^{th}$ cycles (FIG. 17A), $6^{th}$ to $10^{th}$ cycles FIG. 17B, $11^{th}$ to $15^{th}$ cycles (FIG. 17C), and $16^{th}$ to $20^{th}$ cycles (FIG. 17D) with different standby times shown as dashed lines.
Figure 17B:
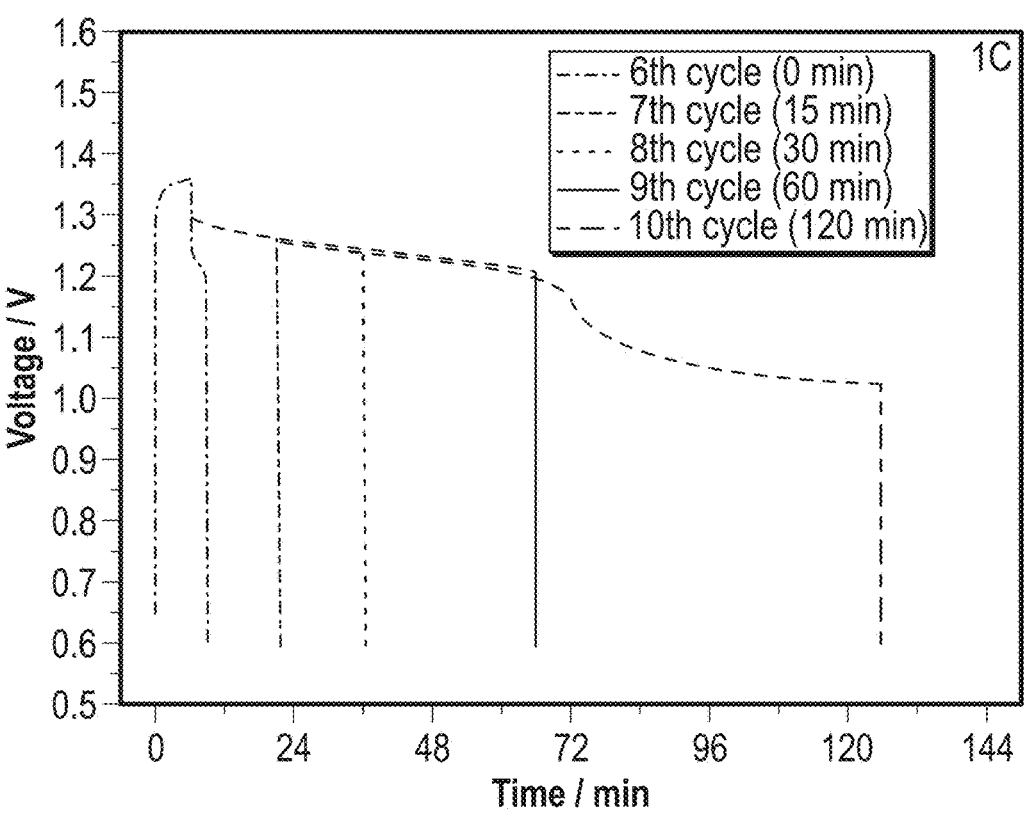
Figure 17C:
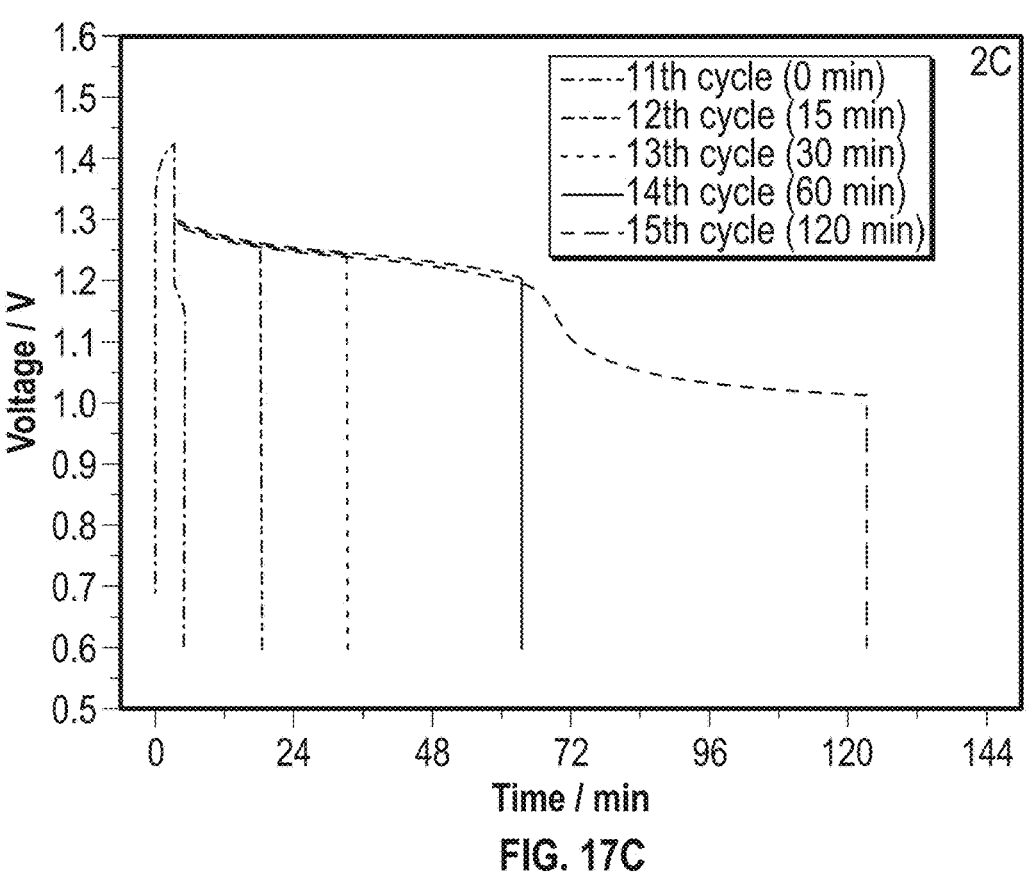
Figure 17D:
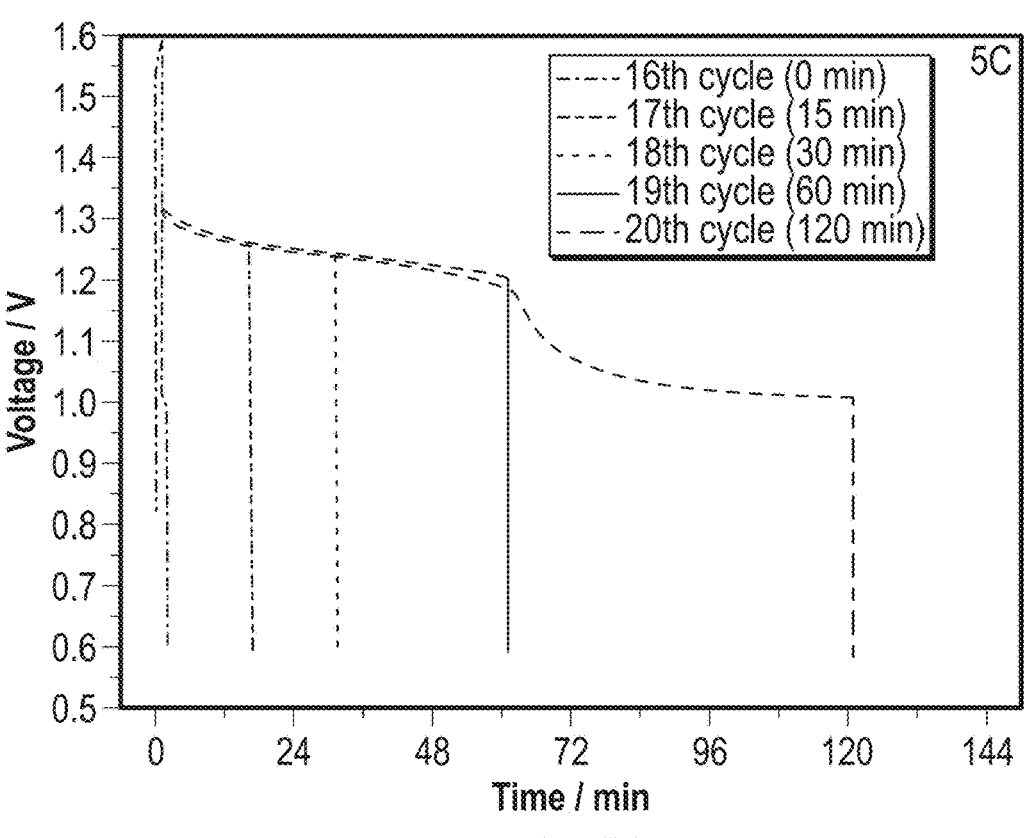
Figure 18A:
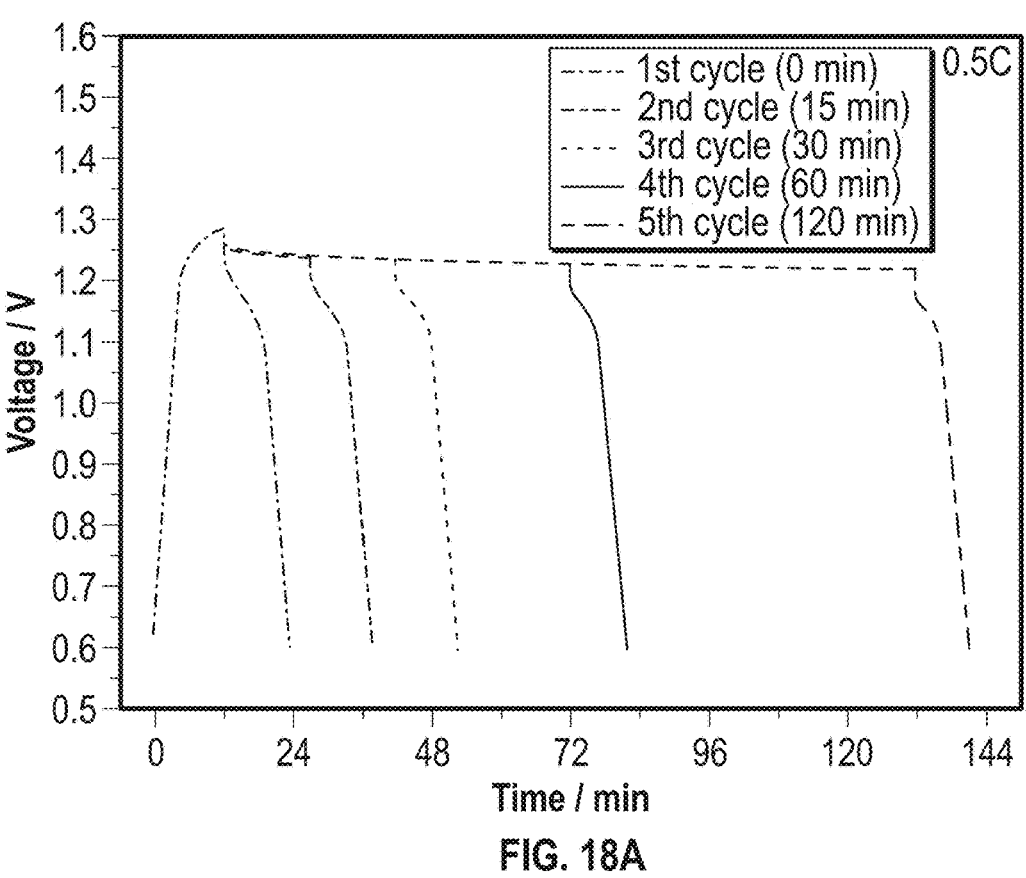
FIGS. 18A-D shows the GCD curves obtained at about 0.5 C of CC+CC-PPy-120 of $1^{st}$ to $5^{th}$ cycles (FIG. 18A), $6^{th}$ to $10^{th}$ cycles FIG. 18B, $11^{th}$ to $15^{th}$ cycles (FIG. 18C), and $16^{th}$ to $20^{th}$ cycles (FIG. 18D) with different standby times shown as dashed lines.
Figure 18B:
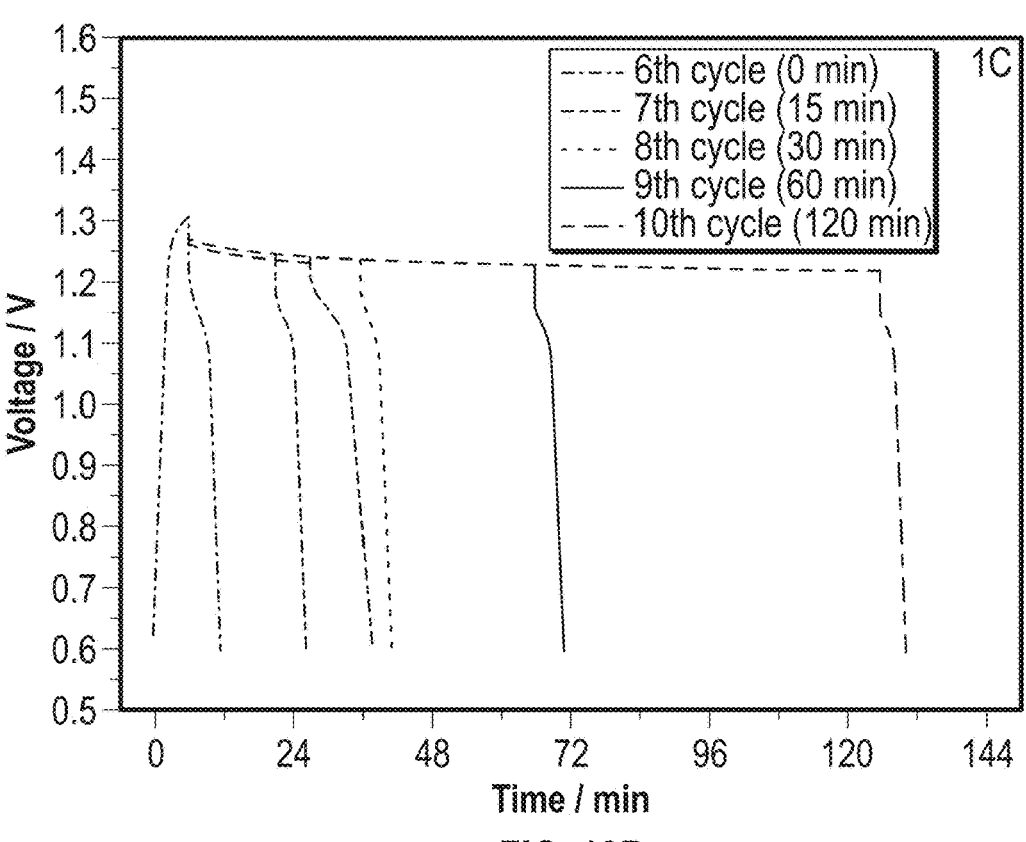
Figure 18C:
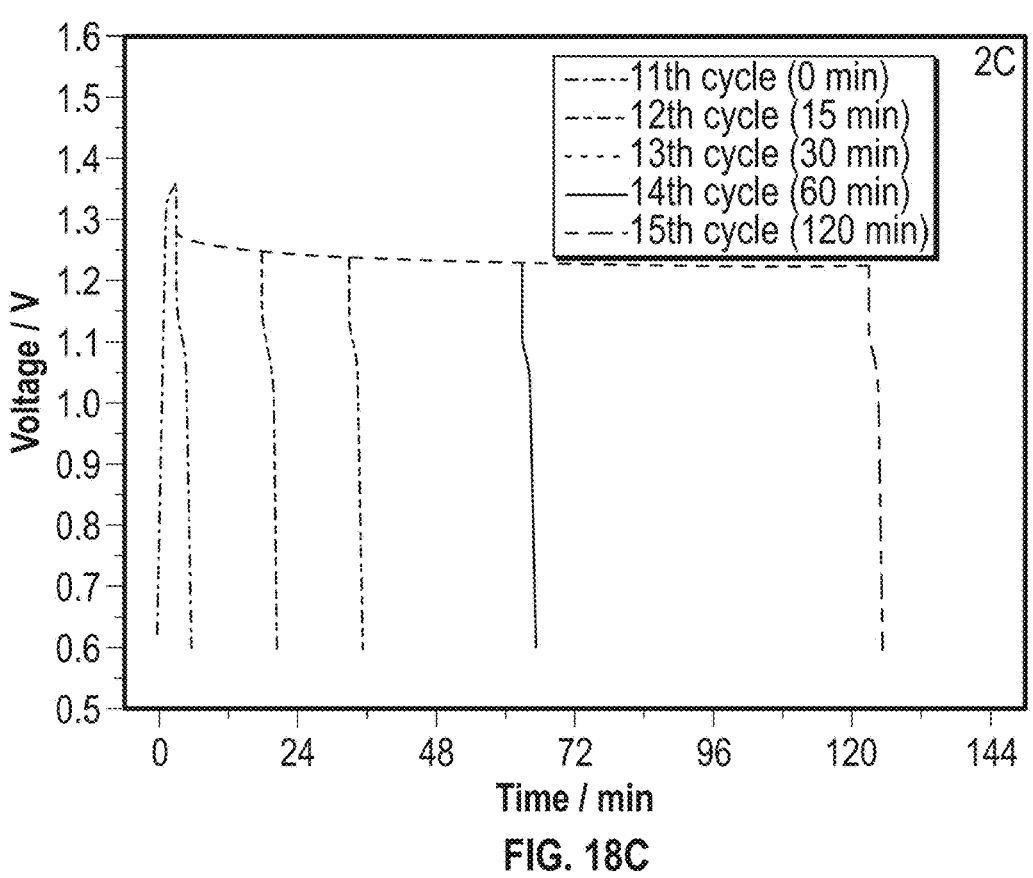
Figure 18D:
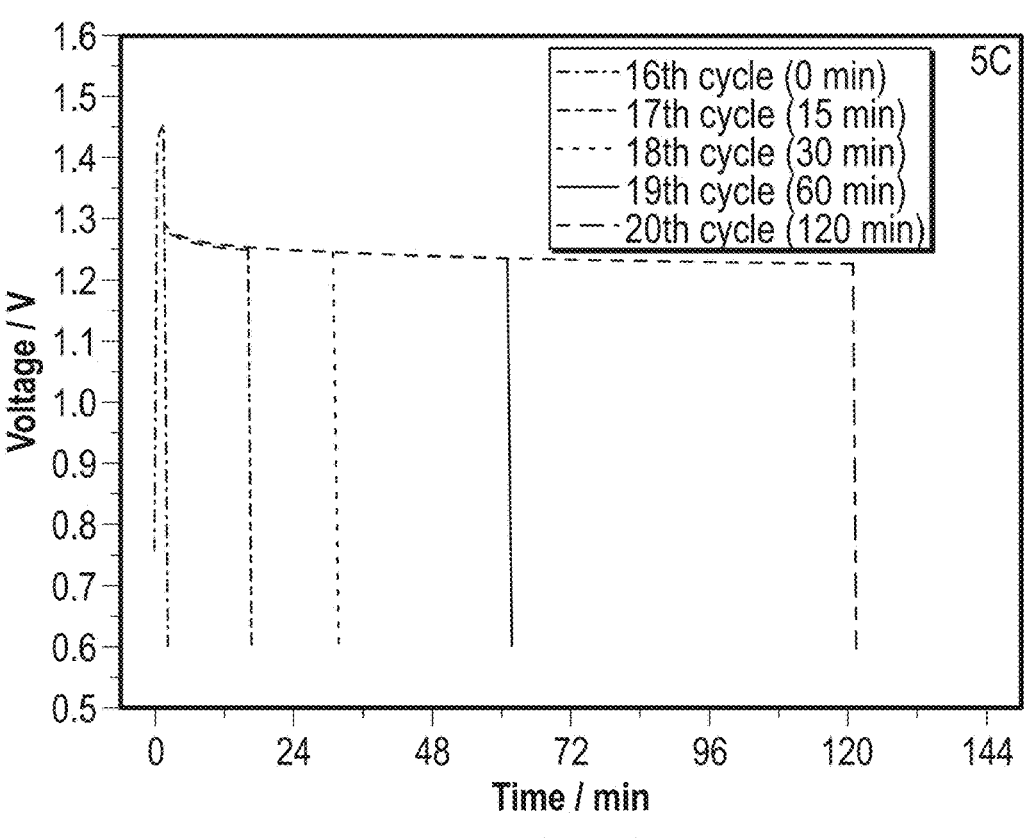

Based on the data of FIGS. 12 and 13, a proposed mechanism is illustrated in FIG. 14. To confirm this mechanism, elemental analysis was conducted for CC-PPy-120 adsorptive layers to probe how the chemical compositions change over the cycles. As shown in graphs of normalized atomic contents of sulfur and iodine of FIG. 15, the variation of sulfur and iodine content on CC-PPy-120 adsorptive layers over the cycles show the opposite trend, as expected for the proposed mechanism. It was previously believed that the $I^-$ doped sites on CC-PPy adsorptive layer are favorable for the adsorption of $I^0$ and, thus, increased the adsorption capacity and reaction kinetics over the cycles. DFT simulations were further conducted to verify the preferential formation of $A-I_3^-$ at the atomic level (see FIG. 16). The simulation results revealed that the iodide ions interact strongly with the PPy chains in an oxidized state (denoted as $PPy^+\cdot I^-$), showing a Gibbs free energy change of adsorption of −1.05 eV. In contrast, the adsorption of iodide ions on graphene (CC surface) is not preferable because it has a Gibbs free energy change of +0.43 eV. Therefore, the doping of $I^-$ in PPy chains was highly plausible.

Furthermore, the optimized geometric structure of $F—I_3^-$ was identified as quasi-octahedral hexacoordinated $[Zn \cdot I_3 \cdot 5H_2O]^+$, which is consistent with prior findings. $[Zn \cdot I_3 \cdot 5H_2O]^+$ is capable of physically adsorbing PPy (with a Gibbs free energy change of adsorption of −2.145 eV, denoted as $PPy^- [Zn \cdot I_3 \cdot 5H_2O]^+$) and graphene (with a Gibbs free energy change of adsorption of −1.869 eV, denoted as $Gr-[Zn \cdot I_3 \cdot 5H2O]^+$) through molecular interactions. Notably, it is thermodynamically more favorable for these three forms of $[Zn \cdot I_3 \cdot 5H_2O]^+$ to further transfer a molecular $I_2$ to $PPy^+ \cdot I^-$ to form $I_3^-$ doped PPy (denoted as $PPy^+ \cdot I_3^-$, given that an $I_3^-$ ion is analog to a molecular $I_2$ linking to an $I^-$ ion with a weak chemical bond). Therefore, $PPy^+ \cdot I_3^-$ should be the most stable form of $A-I_3^-$, which shows strong chemical adsorption to $I_3^-$ ions with a Gibbs free energy change of adsorption of −0.612 eV.

Figure 19:
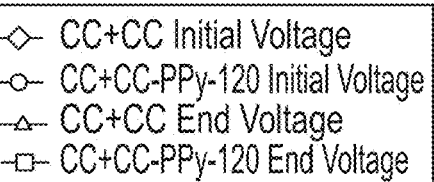
FIG. 19 shows intermittent charge/discharge profile plots of CC+CC and CC+CC-PPy-120 collected at different rates in terms of voltage at the beginning and the end of a standby process.
Figure 19:
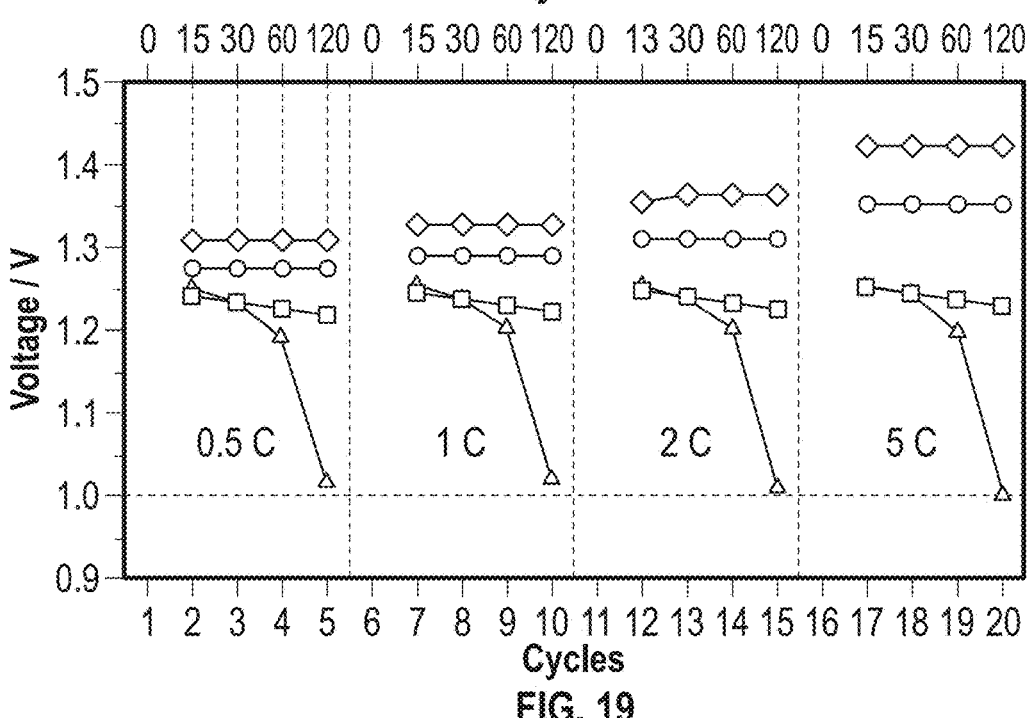

To evaluate the performances of the aqueous rechargeable static ZIBs with double-layered cathodes, intermittent GCD tests were conducted using CC+CC (see galvanostatic charge/discharge (GCD) curves of FIG. 17) and CC+CC-PPy-120 (see GCD curves of FIG. 18) at different charge/discharge rates. CC+CC-PPy-120 was first activated by running ten consecutive GCD cycles at about 0.5 C. Different standby times were applied between charge and discharge processes to allow diffusion/adsorption/shuttle of $I_3^-$ after charging, to rule out the false high CE due to the incomplete shuttling of $F—I_3^-$ before discharging, especially in high-rate consecutive charge/discharge processes. The voltages were recorded at the beginning and the end of the standby processes (see intermittent charge/discharge profile plots of CC+CC and CC+CC-PPy-120 of FIG. 19).

Figure 20:
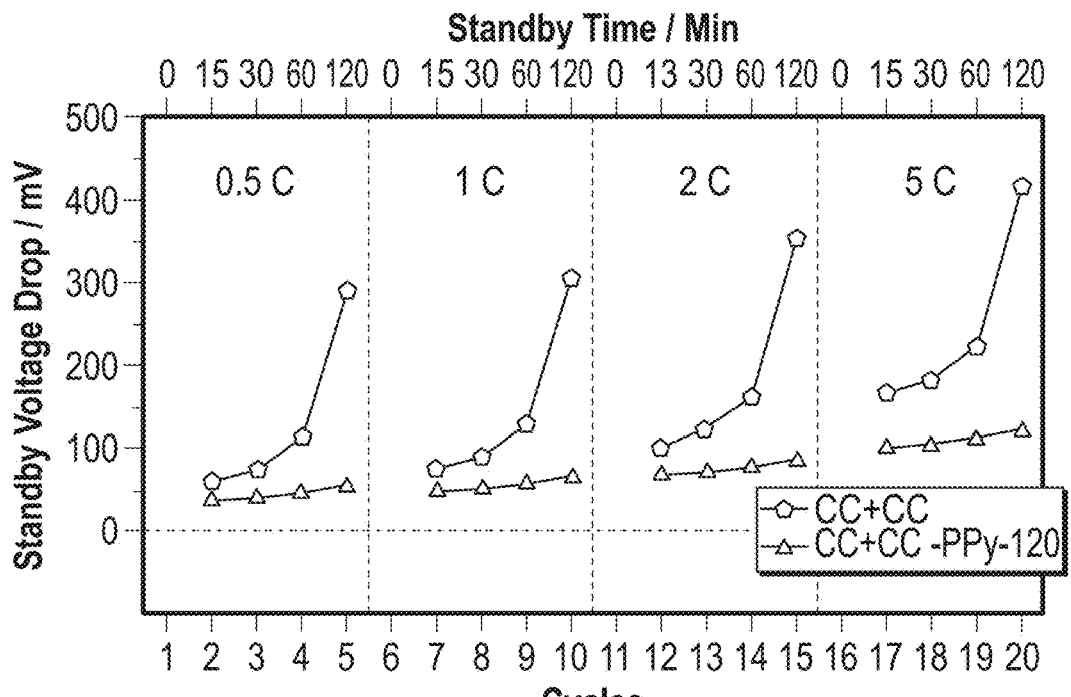
FIG. 20 shows intermittent charge/discharge profile plots of CC+CC and CC+CC-PPy-120 collected at different rates in terms of calculated voltage drops during the standby process.
Figure 21:
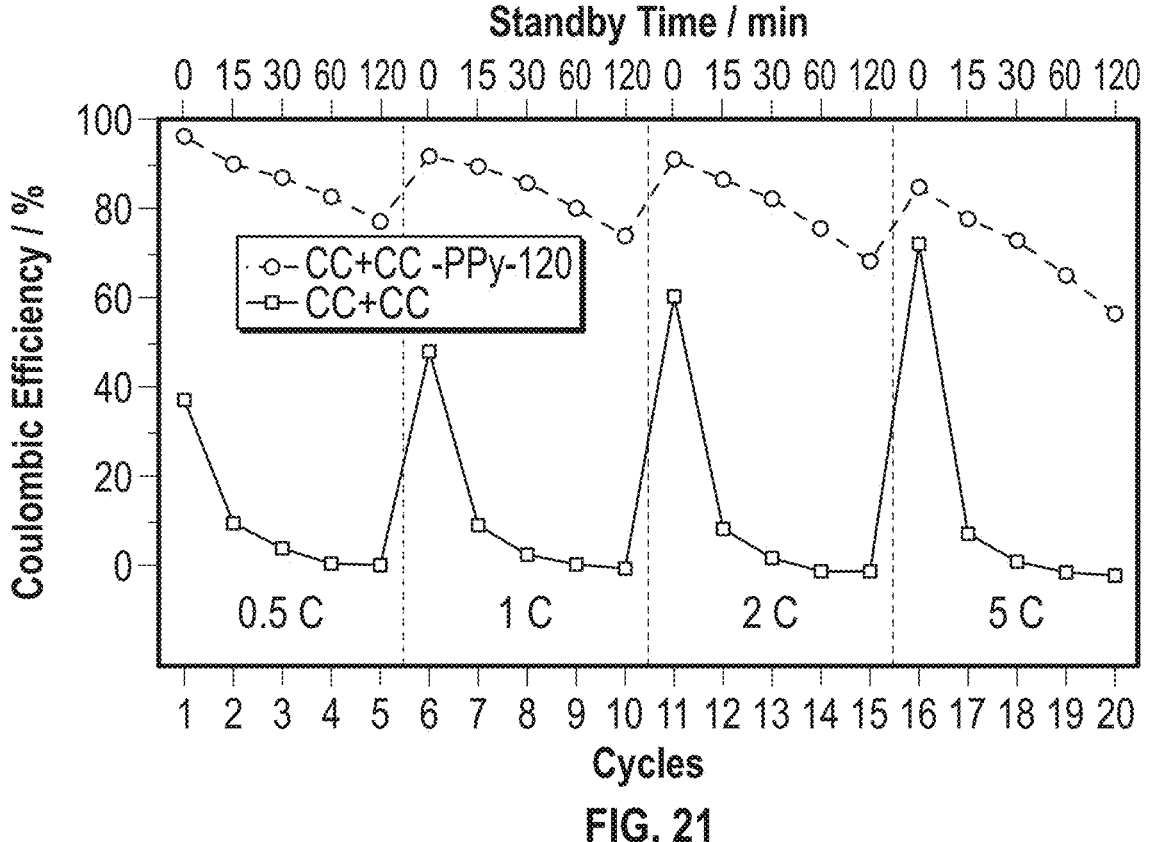
FIG. 21 is a comparison the intermittent charge/discharge profiles of CC+CC and CC+CC-PPy-120 collected at different rates in terms of Coulombic efficiency.
Figure 22A:
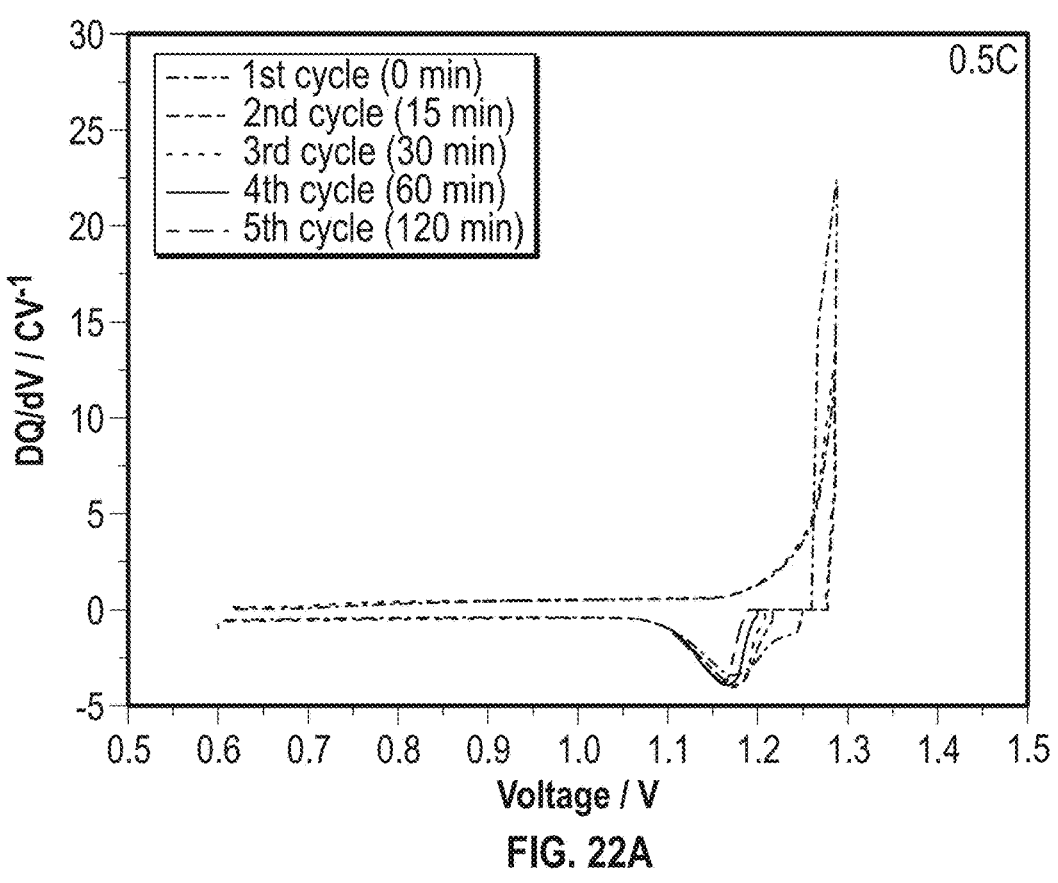
FIGS. 22A-B shows differential capacity plots obtained at about 0.5 C of CC+CC-PPy-120 of $1^{st}$ to $5^{th}$ cycles (FIG. 22A), $6^{th}$ to $10^{th}$ cycles FIG. 22B, $11^{th}$ to $15^{st}$ cycles (FIG. 22C), and $16^{th}$ to $20^{th}$ cycles (FIG. 22D) with different standby times shown as dashed lines.
Figure 22B:
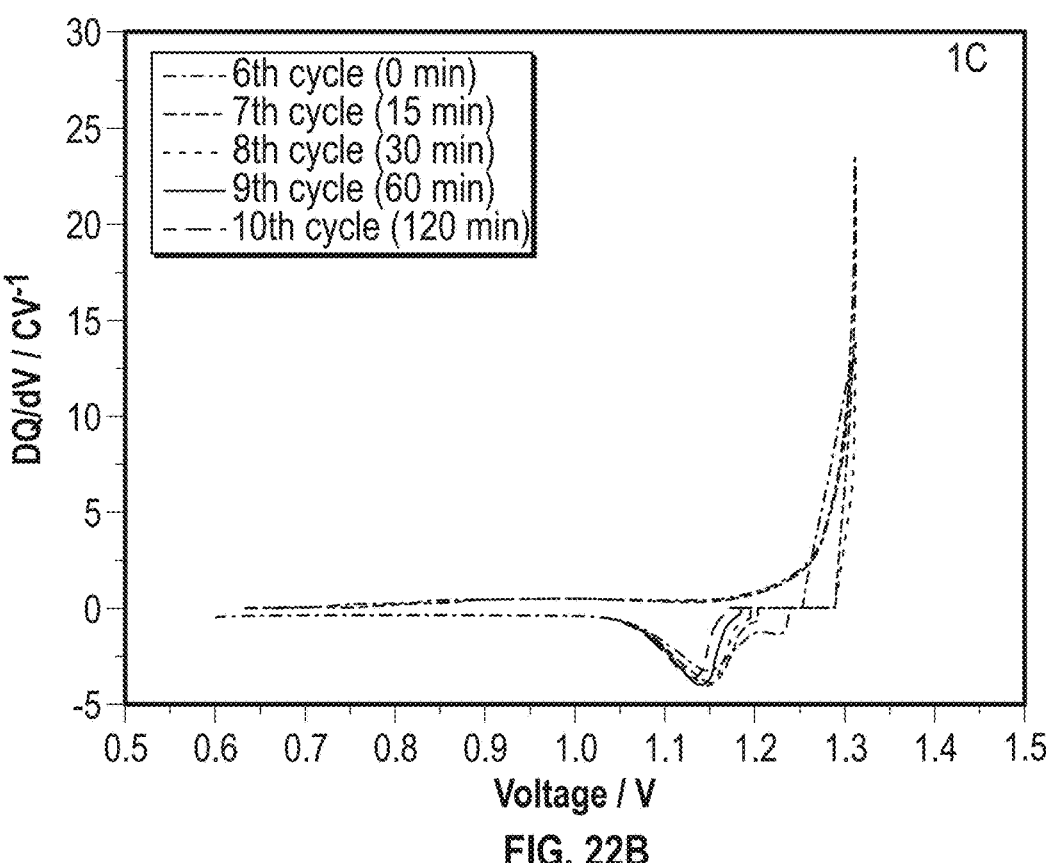
Figure 22C:
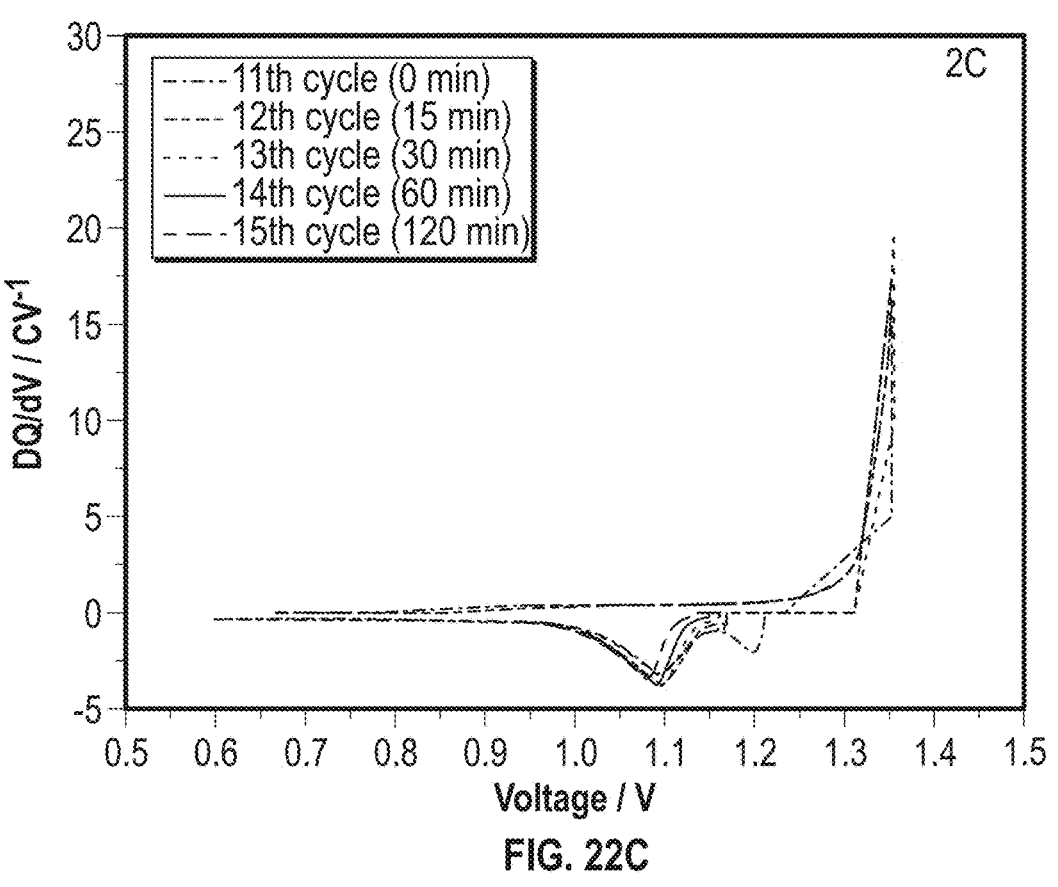
Figure 22D:
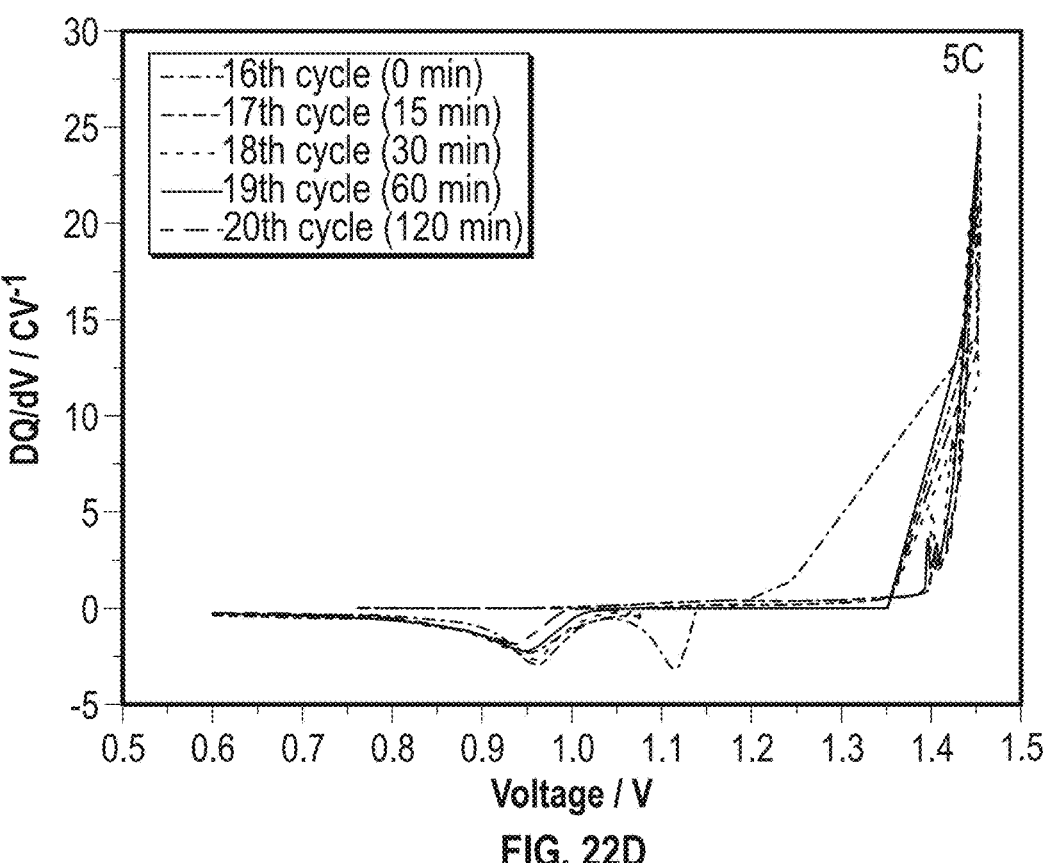

The differences between the initial voltage and end voltage represents the voltage loss of the ZIB during standby (intermittent charge/discharge profile plots of CC+CC and CC+CC-PPy-120 of FIG. 20). CC+CC-PPy-120 exhibited much smaller voltage drops compared to CC+CC, and its voltage drops did not increase drastically when the standby time extended from 15 mins to 2 hours. The contribution of PPy in suppressing self-discharge is evidenced from the smaller voltage drop. Notably, when CC+CC ZIBs were placed on standby for more than 60 mins after becoming fully charged, the voltage dropped by more than 300 mV to near 1.00 V due to the shuttling of generated F—$I_3^-$. As a result, the discharging capacities and CEs of CC+CC were near zero (see comparison the intermittent charge/discharge profiles of CC+CC and CC+CC-PPy-120 of FIG. 21). In contrast, the voltage of CC+CC-PPy-120 remained above 1.22 V even after 120 mins of standby, which suggests that F—$I_3^-$ are effectively adsorbed to form A-$I_3^-$, and A-$I_3^-$ are rarely shuttled. This is confirmed by the differential capacity plots of CC+CC-PPy-120 of FIGS. 22A-D, where the F—$I_3^-$ discharging voltage peaks completely disappeared after the standby process, while the A-$I_3^-$ discharging voltage remained nearly unchanged and even slightly increased in peak height (with standby time up to 60 mins). This means that the amount of discharged A-$I_3^-$ was increased, and the extra A-$I_3^-$ came from the capture of F—$I_3^-$ during standby. Benefitting from the $I_3^-$-adsorbing layer, CC+CC-PPy-120 achieved CE as high as about 95.6% (at 0.5 C and 0 min standby), which shows significant improvement compared to the poor CE of CC+CC (see comparison the intermittent charge/discharge profiles of CC+CC and CC+CC-PPy-120 of FIG. 21). Even at high rates where the accelerated generation and diffusion of F—$I_3^-$ were accelerated, the CC-PPy-120 adsorptive layers were still able to efficiently trap F—$I_3^-$ to mitigate the self-discharge.

Figure 23:
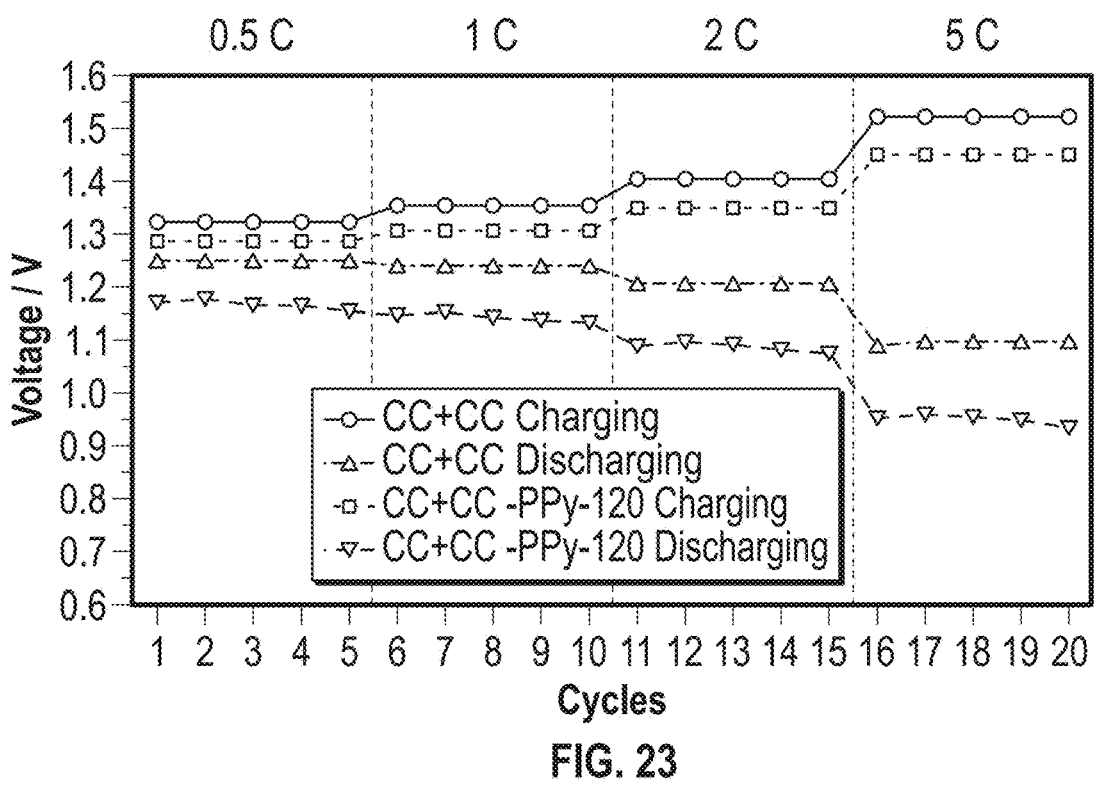
FIG. 23 shows intermittent charge/discharge profiles of CC+CC and CC+CC-PPy-120 collected at different rates in terms of charging and discharging voltages.
Figure 24:
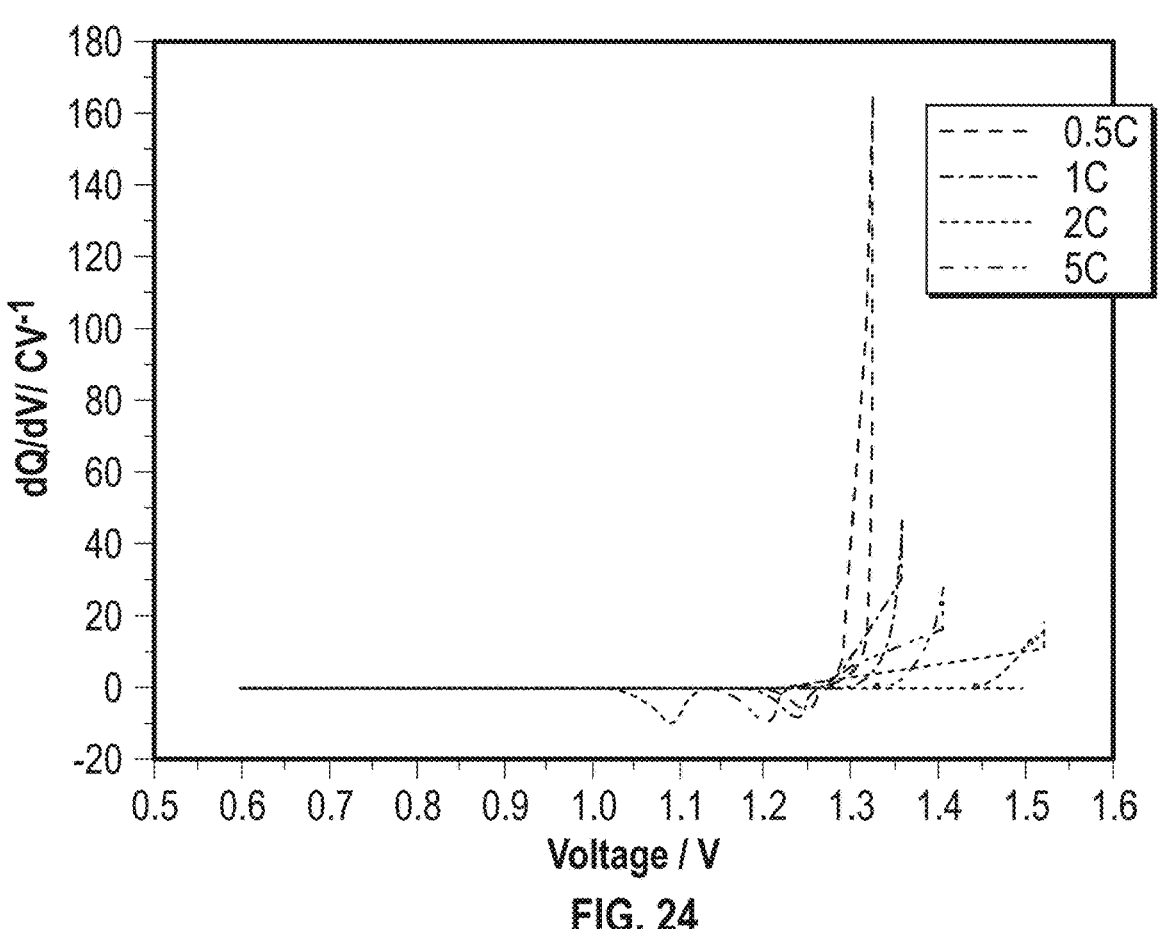
FIG. 24 shows differential capacity plot of CC+CC at different rates in consecutive GCD tests.
Figure 25:
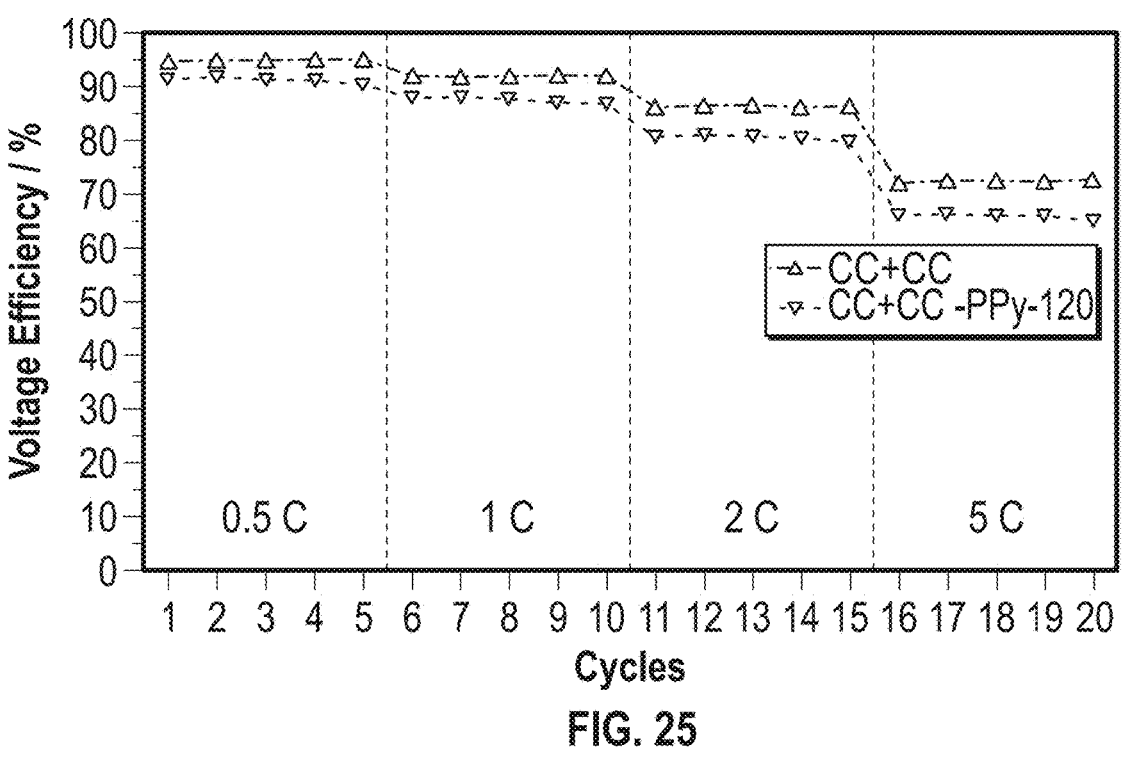
FIG. 25 shows intermittent charge/discharge profiles of CC+CC and CC+CC-PPy-120 collected at different rates in terms of voltage efficiency.

Furthermore, the charging/discharging voltages and voltage efficiencies (VEs) of CC+CC-PPy-120 were studied and intermittent charge/discharge profiles of CC+CC and CC+CC-PPy-120 collected at different rates are shown in FIG. 23. Since the voltages of CC+CC discharging after standby process were indistinguishable (mainly from capacitance of CC), charging/discharging voltages from consecutive GCD tests of CC+CC were used to compare distinguishable F—$I_3^-$ discharging voltages at different rates (see differential capacity plot of CC+CC at different rates in consecutive GCD tests of FIG. 24). Due to the lower Gibbs free energy of A-$I_3^-$ it was concluded based on experimental and theoretical investigation, the charging and discharging voltages of the A-$I_3^-$/$I^-$ redox couple are lower than those of F-I3-/I- redox couple. Therefore, the charging/discharging voltages of CC+CC-PPy-120 are lower than those of CC+CC under all rates (see FIG. 23). Thus, CC+CC-PPy-120 still delivered decent VEs under all rates with only up to 5% lower than that of CC+CC (see intermittent charge/discharge profiles of CC+CC and CC+CC-PPy-120 of FIG. 25), indicating that the introduction of CC-PPy-120 adsorptive layers did not severely hinder the kinetics during charging/discharging.

Figure 26:
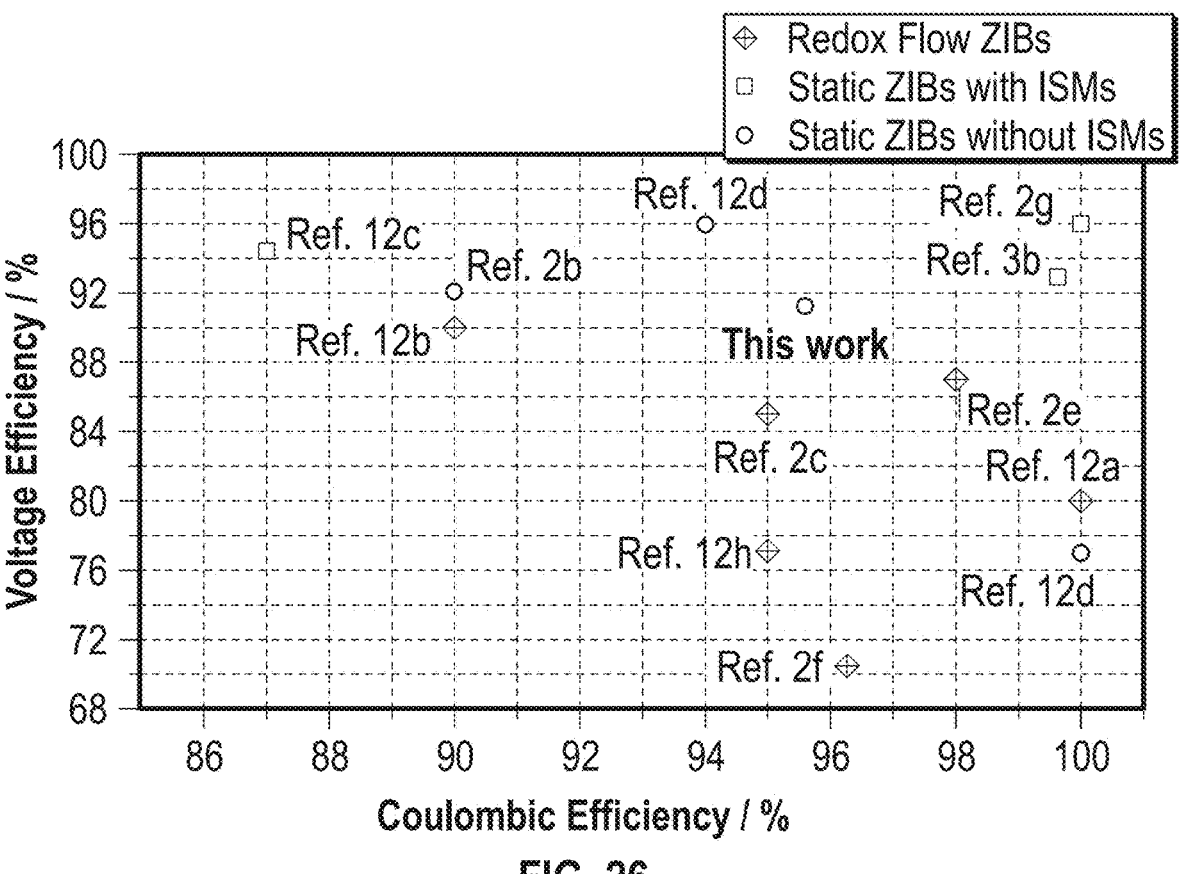
FIG. 26 shows a comparison of prior art aqueous rechargeable Zn—$I_2$ batteries with iodine free cathodes with the battery according to the present disclosure in terms of columbic efficiency and voltage efficiency.
Figure 27:
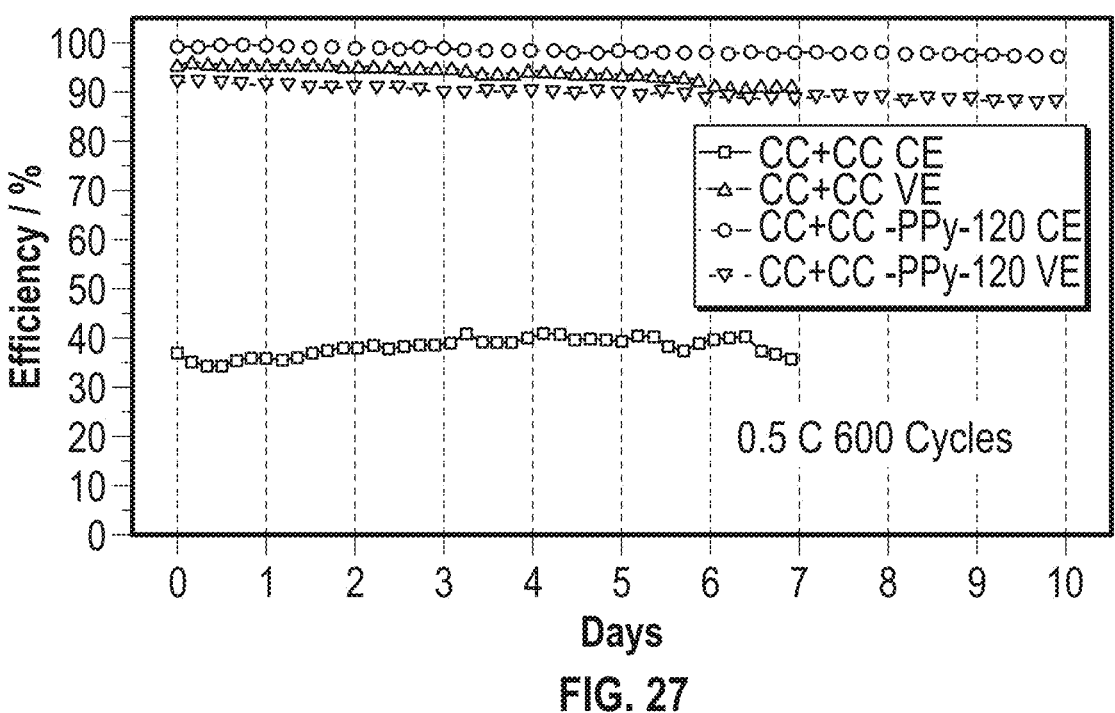
FIG. 27 is a plot showing the cyclic stability of Coulombic and voltage efficiencies of CC+CC and CC+CC-PPy-120 obtained at about 0.5 C for 600 cycles.
Figure 28A:
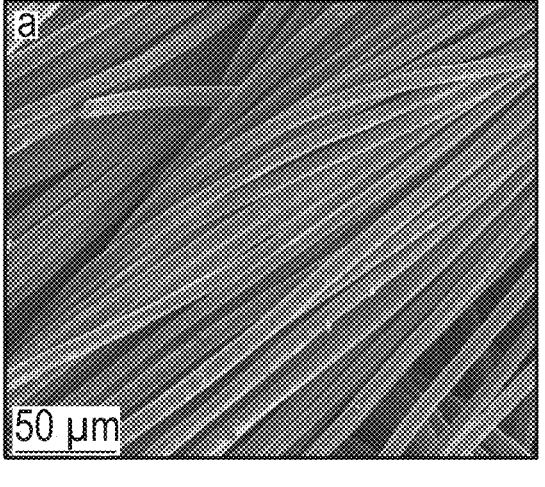
FIGS. 28A-B are SEM images of CC-PPy-120 adsorptive layer after 10 days of charge/discharge cycle at 50 μm (FIG. 28A) and 5 μm (FIG. 28B) magnifications.
Figure 28B:
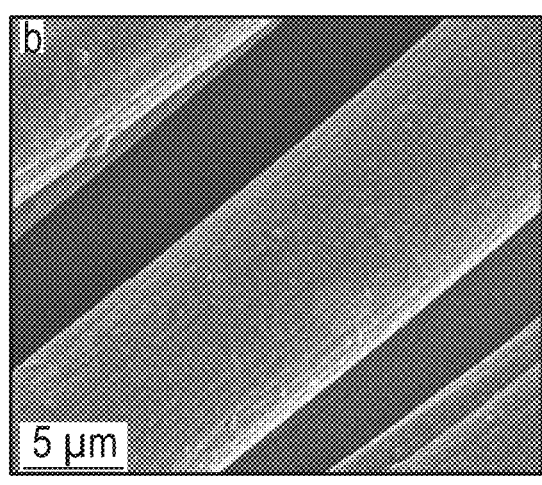

In comparison to previously disclosed aqueous rechargeable ZIBs with iodine-free cathodes (see FIG. 26), the double-layered cathode according to the present disclosure allows the prototypical ZIB to offer highly competitive values with approximately 95% CE and 91% VE. The retention of CE and VE of CC+CC and CC+CC-PPy-120 in long-term charge/discharge cycling at 0.5 C are compared in FIG. 27. Impressively, the ZIB with CC-PPy-120 adsorptive layer maintained both high CE (from about 99.3% to about 97.5%) and high VE (from about 92.5% to about 87.9%) for 600 cycles. CC+CC showed slightly better VE (from about 95.1% to about 91.1%) but much lower CE below approximately 40%. After 10 days of operation, the CC-PPy-120 adsorptive layer did not show any observable structural degradation (see SEM images of CC-PPy-120 adsorptive layer after 10 days of FIGS. 28A and B). The outstanding consistency and durability of high CE and VE of CC-PPy adsorptive layers open up new opportunities to the design, fabrication and applications of aqueous rechargeable ZIBs.

Example 3

This example describes material characterization of double-layered cathodes Example 1.

The microstructures and compositions of the electrode materials were analyzed using a field emission scanning electron microscope (SEM, FEI Quanta 3D FEG dual beam). Elemental analysis was conducted using a Genesis energy-dispersive X-ray spectrometer installed in a FEI Quanta 200 environmental scanning electron microscope (ESEM). The CC-PPy-120 adsorptive layers for elemental analysis were re-charged to 1.15 V after galvanostatic charge/discharge cycles to ensure PPy at the same fully charged (doped) state as the as-prepared counterparts. 1.15 V is the open circuit potential of the as-assembled ZIBs with the as-prepared CC-PPy-120 adsorptive layers, and the oxidation of $I^-$ to $I_3^-$ does not take place at this voltage. The atomic content of sulfur and iodine were normalized to the atomic content of nitrogen, because the nitrogen content is directly correlated to the mass loading of PPy.

Example 4

This example describes fabrication of ZIBs of Example 1 using a Swagelok cell.

A Swagelok cell includes a polytetrafluoroethylene case and two stainless-steel rods as current collectors. To prevent corrosion during charging/discharging in the mild acidic electrolyte, the end of each stainless-steel rod was protected with a titanium cap. Inside the Swagelok cell case, the aqueous Zn—$I_2$ battery was assembled with a zinc foil anode, an anode-side separator (to prevent zinc dendrite penetration), a cathode-side separator (to reserve enough electrolyte), an adsorptive layer, a CC conductive layer, and 60 μL $ZnI_2$ electrolyte. The CC conductive layers and the zinc anodes were hollow punched with a diameter of $\frac{9}{32}$ inches (40 mm²) from a CC sheet and a zinc foil (0.8 mm thick), respectively. The anode-side separator and the cathode-side separator were hollow punched with a diameter of $\frac{3}{8}$ inches (71 mm2) from a Whatman glass microfiber filter and a Whatman filter paper, respectively. The adsorptive layer was hollow punched with a diameter of $\frac{5}{16}$ inches (49.7 mm²) from a CC-PPy-x sample or a CC (as control sample). The electrolyte was prepared by dissolving 0.5 M $ZnI_2$ powders into 0.1 M HAc/NaAc buffer solution.

Example 5

This example describes electrochemical measurements.

All electrochemical tests were conducted on an electrochemical workstation (BioLogic) using Swagelok cells. Data were collected after a 2-cycle cyclic voltammetry test at 10 mV s⁻¹ (0.8~1.6 V) to allow complete permeation of electrolyte. All current rates are determined by the capacity of the $ZnI_2$ in the electrolyte. For a typical electrolyte volume of 60 μL, the charges required to fully reduce $Zn^{2+}$ to Zn0 (or fully oxidize $I^-$ to $I_2$) is 1.6 mA h, and therefore 1 C=1.6 mA. As a prototypical study, the depths of charge of all galvanostatic charge/discharge tests in this work were fixed at 10% (approximately 0.16 mA/h). The frequency range of electrochemical impedance spectroscopy was from about $10^{-2}$ to about $10^6$ Hz.

Example 5

This example describes density functional theory (DFT) calculations.

The Vienna ab initio simulation package (VASP) was employed to perform all DFT calculations, including geometric structures optimization and adsorption energy. For each calculation, projected augmented wave (PAW) method combined with exchange-correlation functional of Perdew-Burke-Ernzerhof (PBE) in the generalized gradient approximation (GGA)2-3 were used to describe ion-electron interactions, using the parameters of $10^{-5}$ eV in energy, $10^{-2}$ eV/Å in force and 500 eV in cut-off energy. In order to accurately describe the weak interactions, the Grimme DFT-D3 dispersion correction method was employed for all calculations.

It will be appreciated that of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components according to claims should not be implied or imported from the specification or any other claims as to any particular order, number, position, size, shape, angle, or material.

What is claimed is:

1. A cathode for a zinc-iodine redox flow battery including an aqueous electrolyte solution of zinc iodide, the cathode comprising:

a first layer comprising a two-dimensional carbon structure triiodide ions, wherein the triiodide ions are generated when the cathode contacts the aqueous electrolyte solution of zinc iodide; and a second layer disposed on and in contact with the first layer, the second layer comprising an electrically-conductive polymer film including at least one of polypyrrole or poly(3,4-ethylenedioxythiophene), wherein the second layer adsorbs the generated triiodide ions, such that the triiodide ions are reduced at an interface between the first layer and the second layer.

2. The cathode according to claim 1, wherein the two-dimensional carbon structure is one of a carbon fiber cloth or graphene.

3. The cathode according to claim 1, wherein the second layer includes the polymer film deposited on a second conductive material, which is a two-dimensional carbon structure.

4. The cathode according to claim 3, wherein the polymer film is electro-polymerized onto the second conductive material.

5. The cathode according to claim 4, wherein electro-polymerization of the polymer film is carried out in about 10 cycles to about 300 cycles.

6. The cathode according to claim 4, wherein the polymer film is deposited at a concentration from about 1.00 mg/cm² to about 10.00 mg/cm².

7. The cathode according to claim 6, wherein the polymer film is deposited at a concentration of about 1.48 mg/cm², 2.88 mg/cm², 5.23 mg/cm², or 9.56 mg/cm².

8. A battery comprising the cathode of claim 1 and a zinc anode.

9. The battery according to claim 8, further comprising an aqueous electrolyte solution including iodine.

* * * * *